(12) United States Patent
Sasaki et al.

(10) Patent No.: US 8,498,077 B1
(45) Date of Patent: Jul. 30, 2013

(54) MAGNETIC HEAD FOR PERPENDICULAR MAGNETIC RECORDING HAVING A MAIN POLE AND A SHIELD

(75) Inventors: Yoshitaka Sasaki, Santa Clara, CA (US); Hiroyuki Ito, Milpitas, CA (US); Kazuki Sato, Milpitas, CA (US); Shigeki Tanemura, Milpitas, CA (US); Tatsuya Shimizu, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/556,654

(22) Filed: Jul. 24, 2012

(51) Int. Cl.
*G11B 5/147* (2006.01)
(52) U.S. Cl.
USPC .................................................. 360/123.06
(58) Field of Classification Search
USPC .................................................. 360/123.06
See application file for complete search history.

(56) References Cited

U.S. PATENT DOCUMENTS

| | | | |
|---|---|---|---|
| 6,687,096 B2 * | 2/2004 | Sasaki et al. ................. | 360/317 |
| 6,954,340 B2 | 10/2005 | Shukh et al. | |
| 7,151,647 B2 * | 12/2006 | Sasaki et al. ............. | 360/125.45 |
| 7,392,578 B2 * | 7/2008 | Sasaki et al. ............... | 29/603.15 |
| 7,764,464 B2 * | 7/2010 | Kobayashi ............... | 360/123.06 |
| 8,300,357 B1 * | 10/2012 | Sasaki et al. ............. | 360/123.06 |
| 8,345,382 B1 * | 1/2013 | Sasaki et al. ............. | 360/123.06 |
| 2005/0083608 A1 * | 4/2005 | Watanabe ..................... | 360/126 |
| 2005/0128637 A1 | 6/2005 | Johnston et al. | |

OTHER PUBLICATIONS

U.S. Appl. No. 13/084,168, filed on Apr. 11, 2011, in the name of Sasaki et al.
U.S. Appl. No. 13/556,784, filed on Jul. 24, 2012, in the name of Sasaki et al.

* cited by examiner

*Primary Examiner* — Mark Blouin
(74) *Attorney, Agent, or Firm* — Oliff & Berridge, PLC

(57) ABSTRACT

A magnetic head includes first to third coils, a main pole, a write shield, first and second yoke layers, and first and second coupling parts. The first and second yoke layers are magnetically connected to the write shield. The first yoke layer is located on the leading side relative to the main pole, whereas the second yoke layer is located on the trailing side relative to the main pole. The first coupling part magnetically couples the main pole and the second yoke layer to each other. The second coupling part magnetically couples the first yoke layer and the second yoke layer to each other. The first coil is wound around the first coupling part, whereas the second and third coils are wound around the second coupling part.

8 Claims, 19 Drawing Sheets

MAGNETIC HEAD FOR PERPENDICULAR MAGNETIC RECORDING HAVING A MAIN POLE AND A SHIELD

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that has a main pole and a shield.

2. Description of Related Art

The recording systems of magnetic read/write apparatuses include a longitudinal magnetic recording system wherein signals are magnetized in a direction along the plane of a recording medium (the longitudinal direction) and a perpendicular magnetic recording system wherein signals are magnetized in a direction perpendicular to the plane of a recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure where a read head section having a magnetoresistive element (hereinafter, also referred to as MR element) for reading and a write head section having an induction-type electromagnetic transducer for writing are stacked on the top surface of a substrate. The write head section includes a main pole that produces a write magnetic field in a direction perpendicular to the plane of a recording medium. The main pole includes, for example, a track width defining portion having an end located in a medium facing surface that faces a recording medium, and a wide portion that is connected to the other end of the track width defining portion and is greater in width than the track width defining portion. The track width defining portion has a generally constant width. To achieve higher recording density, it is required that the write head section of the perpendicular magnetic recording system be smaller in track width and improved in write characteristics such as overwrite property which is a parameter indicating an overwriting capability.

A magnetic head for use in a magnetic disk drive such as a hard disk drive is typically provided in a slider. The slider has the medium facing surface mentioned above. The medium facing surface has an air inflow end (a leading end) and an air outflow end (a trailing end). The slider is designed to slightly fly over the surface of a recording medium by means of an airflow that comes from the air inflow end into the space between the medium facing surface and the recording medium.

Here, the side of positions closer to the leading end relative to a reference position will be defined as the leading side, and the side of positions closer to the trailing end relative to the reference position will be defined as the trailing side. The leading side is the rear side in the direction of travel of the recording medium relative to the slider. The trailing side is the front side in the direction of travel of the recording medium relative to the slider.

The magnetic head is typically disposed near the trailing end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew mentioned above can cause the phenomenon that signals already written on one or more tracks that are adjacent to a track targeted for writing are erased or attenuated during writing of a signal on the track targeted for writing (such a phenomenon will hereinafter be referred to as adjacent track erasure). For higher recording densities, it is necessary to prevent adjacent track erasure.

Providing a write shield near the main pole is effective for preventing adjacent track erasure induced by the skew mentioned above and increasing the recording density. For example, U.S. Pat. No. 6,954,340 B2 and U.S. Patent Application Publication No. 2005/0128637 A1 each disclose a magnetic head including a write shield having an end face that is located in the medium facing surface to wrap around an end face of the main pole.

A magnetic head including a write shield is typically provided with one or more return path sections for connecting the write shield to a part of the main pole away from the medium facing surface. The one or more return path sections form one or more spaces between the main pole and the one or more return path sections. A coil or coils are provided to pass through the one or more spaces. The write shield and the one or more return path sections have the function of capturing a magnetic flux that is produced from the end face of the main pole and spreads in directions other than the direction perpendicular to the plane of the recording medium, so as to prevent the magnetic flux from reaching the recording medium. The write shield and the one or more return path sections also have the function of allowing a magnetic flux that has been produced from the end face of the main pole and has magnetized the recording medium to flow back to the main pole. Thus, the magnetic head including the write shield makes it possible to prevent adjacent track erasure and allows a further improvement of the recording density.

U.S. Pat. No. 6,954,340 B2 and U.S. Patent Application Publication No. 2005/0128637 A1 each disclose a magnetic head including, as the aforementioned one or more return path sections, a return path section located on the trailing side relative to the main pole and a return path section located on the leading side relative to the main pole.

The position of an end of a record bit to be recorded on a recording medium depends on the position of the trailing-side end of the end face of the main pole located in the medium facing surface. To define the position of the end of the record bit with high accuracy, it is therefore effective to provide the write shield with an end face including an end face portion located on the trailing side relative to the end face of the main pole.

In addition, as the frequency of a recording signal is increased in order to increase the recording density, the magnetic head is required to be improved in the rate of change in the direction of the magnetic flux produced from the end face of the main pole. To satisfy this requirement in the magnetic head having a write shield, it is particularly effective to provide a return path section located on the trailing side relative to the main pole and to reduce the length of the return path section, in addition to forming the end face of the write shield to include an end face portion located on the trailing side relative to the end face of the main pole. To this end, it is effective to reduce the number of turns of the coil passing through the space formed between the main pole and the return path section. However, this would cause a shortage of magnetomotive force produced by the coil, thereby hindering the main pole from producing a write magnetic field of sufficient magnitude.

As such, it has conventionally been difficult to allow the main pole to produce a write magnetic field of sufficient magnitude while reducing the length of a magnetic path that is located on the front side in the direction of travel of a recording medium (the trailing side) relative to the main pole and connects the write shield and a part of the main pole away from the medium facing surface to each other.

OBJECT AND SUMMARY OF THE INVENTION

It is an object of the present invention to provide a magnetic head for perpendicular magnetic recording that allows the main pole to produce a write magnetic field of sufficient magnitude while allowing a reduction in length of a magnetic path that is located on the front side in the direction of travel of a recording medium relative to the main pole and connects the write shield and a part of the main pole away from the medium facing surface to each other.

A magnetic head for perpendicular magnetic recording of the present invention includes: a medium facing surface that faces a recording medium; first, second, and third coils; a main pole; a write shield made of a magnetic material; a gap part made of a nonmagnetic material; first and second yoke layers made of a magnetic material and magnetically connected to the write shield; and first and second coupling parts. The first, second, and third coils produce magnetic fields corresponding to data to be written on the recording medium. The main pole has an end face located in the medium facing surface. The main pole allows magnetic fluxes corresponding to the magnetic fields produced by the first, second, and third coils to pass, and produces a write magnetic field for writing the data on the recording medium by means of a perpendicular magnetic recording system. The write shield has an end face located in the medium facing surface. The gap part is interposed between the main pole and the write shield.

The first yoke layer is located on the rear side in the direction of travel of the recording medium relative to the main pole. The second yoke layer is located on the front side in the direction of travel of the recording medium relative to the main pole. The first coupling part is located away from the medium facing surface and magnetically couples the main pole and the second yoke layer to each other. The second coupling part is located away from the medium facing surface and magnetically couples the first yoke layer and the second yoke layer to each other without touching the main pole.

The end face of the write shield includes a first end face portion located on the front side in the direction of travel of the recording medium relative to the end face of the main pole. The first coil is wound around the first coupling part, and includes a portion that passes between the first coupling part and the second coupling part. The second and third coils are located at positions that are different from each other in the direction of travel of the recording medium, and are wound around the second coupling part.

In the magnetic head for perpendicular magnetic recording of the present invention, the second coupling part may be located farther from the medium facing surface than is the first coupling part.

In the magnetic head for perpendicular magnetic recording of the present invention, the second coil may be located on the rear side in the direction of travel of the recording medium relative to the main pole. In this case, the third coil may be located on the front side in the direction of travel of the recording medium relative to the main pole. Alternatively, assuming a virtual plane that intersects the end face of the main pole located in the medium facing surface and is perpendicular to the direction of travel of the recording medium, at least part of the third coil may be located at a position intersecting the virtual plane.

In the magnetic head for perpendicular magnetic recording of the present invention, each of the second coil and the third coil may have a number of turns no smaller than that of the first coil. Alternatively, the second coil may have a number of turns greater than that of the first coil, while the third coil may have a number of turns no smaller than that of the first coil.

In the magnetic head for perpendicular magnetic recording of the present invention, the end face of the write shield may further include a second, a third, and a fourth end face portion. The second end face portion is located on the rear side in the direction of travel of the recording medium relative to the end face of the main pole. The third and fourth end face portions are located on opposite sides of the end face of the main pole in the track width direction.

In the magnetic head for perpendicular magnetic recording of the present invention, there are formed first and second magnetic paths that lead from the write shield to the main pole. The first magnetic path passes through the second yoke layer and the first coupling part. The first magnetic path is located on the front side in the direction of travel of the recording medium relative to the main pole and connects the write shield and a part of the main pole away from the medium facing surface to each other. The second magnetic path passes through the first yoke layer, the second coupling part, the second yoke layer, and the first coupling part. The first coil is wound around the first coupling part and includes a portion passing between the first coupling part and the second coupling part. The second and third coils are wound around the second coupling part. Consequently, the magnetomotive forces of the first, second, and third coils allow the main pole to produce a write magnetic field of sufficient magnitude even if the number of turns of the first coil is reduced to reduce the length of the first magnetic path. According to the present invention, it is thus possible to produce a write magnetic field of sufficient magnitude from the main pole while reducing the length of the first magnetic path located on the front side in the direction of travel of the recording medium relative to the main pole.

Other objects, features and advantages of the present invention will become fully apparent from the following description.

DETAILED DESCRIPTION OF THE PREFERRED EMBODIMENTS

First Embodiment

Figure 1:
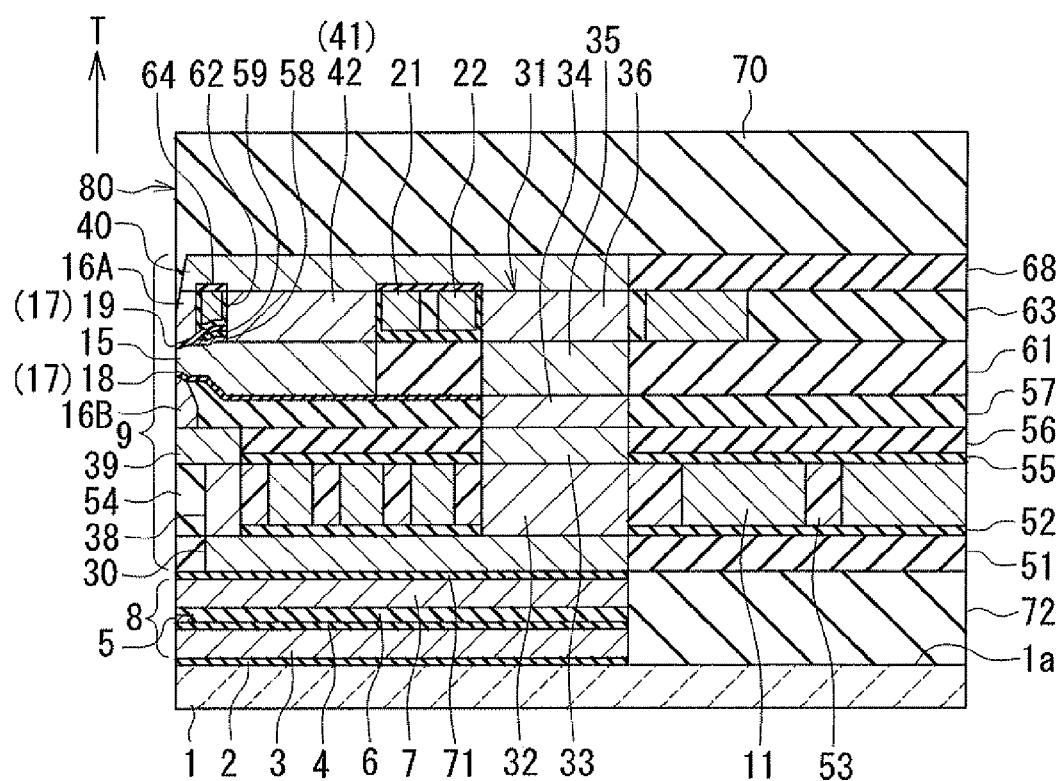
FIG. 1 is a cross-sectional view of a magnetic head according to a first embodiment of the invention.
Figure 2:
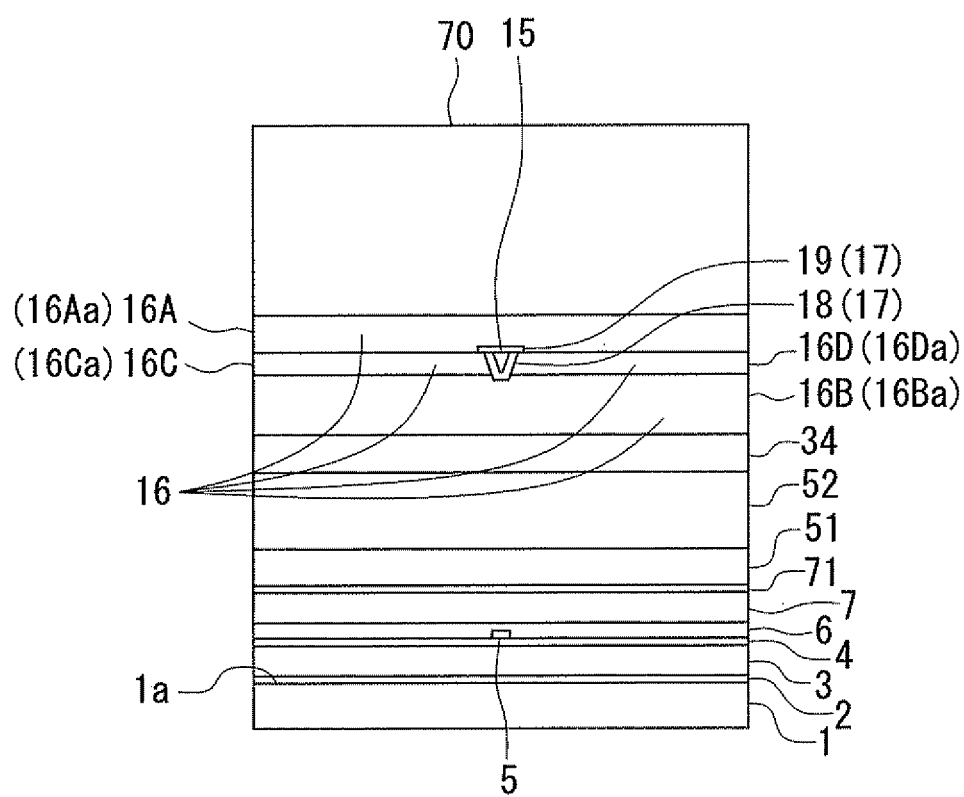
FIG. 2 is a front view showing the medium facing surface of the magnetic head according to the first embodiment of the invention.
Figure 3:
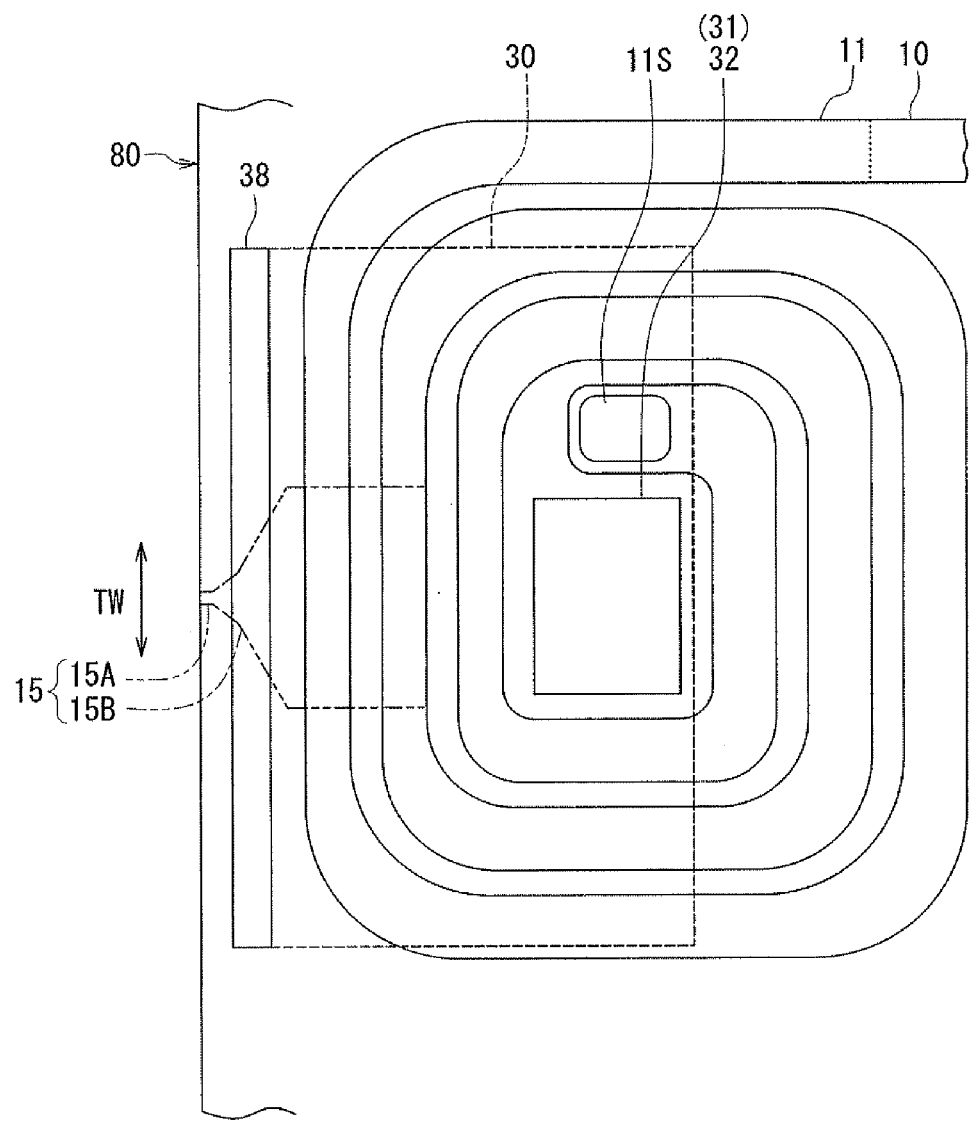
FIG. 3 is a plan view showing a second coil of the magnetic head according to the first embodiment of the invention.
Figure 4:
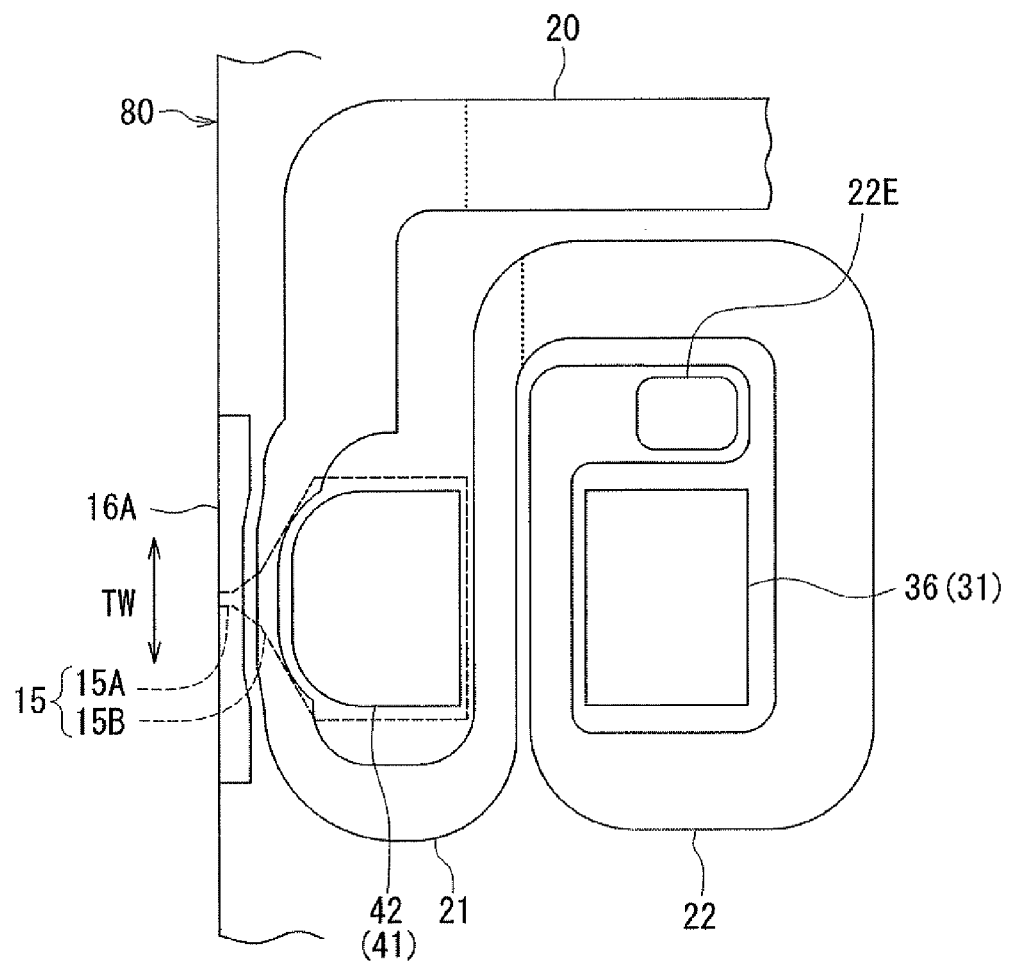
FIG. 4 is a plan view showing first and third coils of the magnetic head according to the first embodiment of the invention.

Embodiments of the present invention will now be described in detail with reference to the drawings. First, reference is made to FIG. 1 to FIG. 4 to describe the configuration of a magnetic head according to a first embodiment of the invention. FIG. 1 is a cross-sectional view of the magnetic head according to the present embodiment. In FIG. 1, the arrow with the symbol T indicates the direction of travel of a recording medium. FIG. 2 is a front view showing the medium facing surface of the magnetic head according to the present embodiment. FIG. 3 is a plan view showing a second coil of the magnetic head according to the present embodiment. FIG. 4 is a plan view showing first and third coils of the magnetic head according to the present embodiment. The arrows with the symbol TW in FIG. 2 to FIG. 4 indicate track width direction.

As shown in FIG. 1 and FIG. 2, the magnetic head for perpendicular magnetic recording (hereinafter simply referred to as the magnetic head) according to the present embodiment includes: a substrate 1 made of a ceramic material such as aluminum oxide-titanium carbide ($Al_2O_3$—TiC) and having a top surface 1a; an insulating layer 2 made of an insulating material such as alumina ($Al_2O_3$) and disposed on the top surface 1a of the substrate 1; a first read shield layer 3 made of a magnetic material and disposed on the insulating layer 2; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 made of a magnetic material and disposed on the second read shield gap film 6.

An end of the MR element 5 is located in a medium facing surface 80 that faces the recording medium. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head section 8. The magnetic head further includes an insulating layer 71 made of an insulating material and disposed on the second read shield layer 7, and an insulating layer 72 made of an insulating material, disposed on the top surface 1a of the substrate 1 and surrounding the read head section 8 and the insulating layer 71. The insulating layers 71 and 72 are made of alumina, for example. The top surfaces of the insulating layers 71 and 72 are even with each other.

The magnetic head further includes a write head section 9 disposed over the insulating layers 71 and 72. The write head section 9 includes a first coil 21, a second coil 11, a third coil 22, lead layers 10 and 20, a main pole 15, a write shield 16, a gap part 17, a first yoke layer 30, and a second yoke layer 40. The first coil 21, the second coil 11, the third coil 22, and the lead layers 10 and 20 are each made of a conductive material such as copper. The first coil 21, the second coil 11, and the third coil 22 are connected in series or in parallel. The main pole 15 has an end face located in the medium facing surface 80. The main pole 15 allows magnetic fluxes corresponding to magnetic fields produced by the first coil 21, the second coil 11 and the third coil 22 to pass, and produces a write magnetic field for writing data on a recording medium by means of a perpendicular magnetic recording system. FIG. 1 shows a cross section that intersects the end face of the main pole 15 located in the medium facing surface 80 and that is perpendicular to the medium facing surface 80 and to the top surface 1a of the substrate 1 (this cross section will hereinafter be referred to as the main cross section). The lead layers 10 and 20 are used for energizing the first coil 21, the second coil 11, and the third coil 22.

The write shield 16 has an end face located in the medium facing surface 80. The end face of the write shield 16 includes first to fourth end face portions 16Aa, 16Ba, 16Ca, and 16Da. The first end face portion 16Aa is located on the front side in the direction T of travel of the recording medium relative to the end face of the main pole 15. The second end face portion 16Ba is located on the rear side in the direction T of travel of the recording medium relative to the end face of the main pole 15. The third and fourth end face portions 16Ca and 16Da are located on opposite sides of the end face of the main pole 15 in the track width direction TW. In the medium facing surface 80, the first to fourth end face portions 16Aa, 16Ba, 16Ca, and 16Da are arranged to wrap around the end face of the main pole 15.

The write shield 16 is made of a magnetic material. The material employed for the write shield 16 may be CoFeN, CoNiFe, NiFe, or CoFe, for example.

Both of the first yoke layer 30 and the second yoke layer 40 are magnetically connected to the write shield 16. The first yoke layer 30 is located on the rear side in the direction T of travel of the recording medium relative to the main pole 15. The second yoke layer 40 is located on the front side in the direction T of travel of the recording medium relative to the main pole 15. The first and second yoke layers 30 and 40 are each made of a magnetic material. The material employed for each of the first and second yoke layers 30 and 40 may be CoFeN, CoNiFe, NiFe, or CoFe, for example.

The write head section 9 further includes a first coupling part 41 and a second coupling part 31. The first coupling part 41 is located away from the medium facing surface 80 and magnetically couples the main pole 15 and the second yoke layer 40 to each other. The second coupling part 31 is located away from the medium facing surface 80 and magnetically couples the first yoke layer 30 and the second yoke layer 40 to each other without touching the main pole 15. In the example shown in FIG. 1, the second coupling part 31 is located farther from the medium facing surface 80 than is the first coupling part 41.

The first coupling part 41 and the second coupling part 31 are each made of a magnetic material. The material employed for each of the first coupling part 41 and the second coupling part 31 may be CoFeN, CoNiFe, NiFe, or CoFe, for example. The first coupling part 41 is composed of a single magnetic layer 42. The second coupling part 31 includes magnetic layers 32, 33, 34, 35, and 36.

The write head section 9 further includes magnetic layers 38 and 39 made of a magnetic material and magnetically coupling the first yoke layer 30 and the write shield 16 to each other. The material employed for each of the magnetic layers 38 and 39 may be CoFeN, CoNiFe, NiFe, or CoFe, for example.

The first yoke layer 30 is located on the insulating layer 71. The magnetic layers 32 and 38 are both located on the first yoke layer 30. The magnetic layer 38 is located near the medium facing surface 80. The magnetic layer 32 is located farther from the medium facing surface 80 than is the magnetic layer 38. The first yoke layer 30 and the magnetic layer 38 have their respective end faces that face toward the medium facing surface 80. These end faces are located at a distance from the medium facing surface 80. The second coil 11 is wound around the second coupling part 31 (the magnetic layer 32). The lead layer 10 is contiguous with the second coil 11. In FIG. 3, the boundary between the second coil 11 and the lead layer 10 is shown by a dotted line.

The magnetic head further includes an insulating layer 51 made of an insulating material, disposed over the insulating layers 71 and 72 and surrounding the first yoke layer 30, and an insulating layer 52 made of an insulating material, disposed over the first yoke layer 30 and the insulating layer 51 and surrounding the magnetic layers 32 and 38. The second coil 11 and the lead layer 10 are disposed on the insulating layer 52. The insulating layers 51 and 52 are made of alumina, for example.

The magnetic head further includes: an insulating layer 53 made of an insulating material and disposed around the second coil 11, the lead layer 10 and the magnetic layer 32 and in the space between adjacent turns of the second coil 11; and an insulating layer 54 made of an insulating material and disposed around the magnetic layer 38 and the insulating layer 53. The top surfaces of the second coil 11, the lead layer 10, the magnetic layers 32 and 38, and the insulating layers 53 and 54 are even with each other. The insulating layer 53 is made of photoresist, for example. The insulating layer 54 is made of alumina, for example.

The magnetic layer 33 is disposed on the magnetic layer 32. The magnetic layer 39 is disposed over the magnetic layer 38 and the insulating layer 54. The magnetic layer 39 has an end face located in the medium facing surface 80. The magnetic head further includes an insulating layer 55 made of an insulating material and disposed over the top surfaces of the second coil 11, the lead layer 10 and the insulating layers 53 and 54, and an insulating layer 56 made of an insulating material, disposed on the insulating layer 55 and surrounding the magnetic layers 33 and 39. The top surfaces of the magnetic layers 33 and 39 and the insulating layer 56 are even with each other. The insulating layers 55 and 56 are made of alumina, for example.

As shown in FIG. 2, the write shield 16 includes a first shield 16A, a second shield 16B, and two side shields 16C and 16D. The two side shields 16C and 16D are located on opposite sides of the main pole 15 in the track width direction TW. The first shield 16A is located on the front side in the direction T of travel of the recording medium relative to the main pole 15. The second shield 16B is located on the rear side in the direction T of travel of the recording medium relative to the main pole 15. The side shields 16C and 16D magnetically couple the first shield 16A and the second shield 16B to each other.

As shown in FIG. 1 and FIG. 2, the first shield 16A has: the first end face portion 16Aa; a bottom surface; a top surface; and a connecting surface connecting the first end face portion 16Aa and the top surface to each other. The distance from the medium facing surface 80 to an arbitrary point on the connecting surface of the first shield 16A increases with increasing distance from the arbitrary point to the top surface 1a of the substrate 1. As shown in FIG. 2, the second shield 16B has the second end face portion 16Ba. The side shield 16C has the third end face portion 16Ca. The side shield 16D has the fourth end face portion 16Da.

The second shield 16B is disposed on the magnetic layer 39. The magnetic layer 34 is disposed on the magnetic layer 33. The magnetic head further includes a nonmagnetic layer 57 made of a nonmagnetic material. The nonmagnetic layer 57 is disposed on part of the top surface of the magnetic layer 39 and the top surface of the insulating layer 56, and surrounds the second shield 16B and the magnetic layer 34. The nonmagnetic layer 57 is made of alumina, for example.

The main pole 15 has a top surface (see FIG. 1), which is the surface located at the end on the front side in the direction T of travel of the recording medium, and a bottom end (see FIG. 1) opposite to the top surface. The main pole 15 further has first and second side parts (see FIG. 2) that are opposite to each other in the track width direction TW. The side shield 16C has a first sidewall opposed to the first side part of the main pole 15. The side shield 16D has a second sidewall opposed to the second side part of the main pole 15.

The gap part 17 is interposed between the main pole 15 and the write shield 16. The magnetic head further includes a first gap layer 19 made of a nonmagnetic material and a second gap layer 18 made of a nonmagnetic material. A portion of the first gap layer 19 constitutes a portion of the gap part 17. A portion of the second gap layer 18 constitutes another portion of the gap part 17. The portion of the first gap layer 19 constituting the portion of the gap part 17 is located between the main pole 15 and the first shield 16A. The portion of the second gap layer 18 constituting the other portion of the gap part 17 is located between the main pole 15 and each of the second shield 16B and the side shields 16C and 16D.

The side shields 16C and 16D are disposed on the second shield 16B and in contact with the top surface of the second shield 16B. The second gap layer 18 is arranged to extend along the sidewalls of the side shields 16C and 16D and the top surfaces of the second shield 16B and the nonmagnetic layer 57. The second gap layer 18 is made of a nonmagnetic material. The nonmagnetic material employed to form the second gap layer 18 may be an insulating material or a nonmagnetic metal material. Alumina is an example of insulating materials that can be used to form the second gap layer 18. Ru is an example of nonmagnetic metal materials that can be used to form the second gap layer 18.

The main pole 15 is disposed over the second shield 16B and the nonmagnetic layer 57 such that the second gap layer 18 is interposed between the main pole 15 and the top surfaces of the second shield 16B and the nonmagnetic layer 57. As shown in FIG. 2, the second gap layer 18 is interposed also between the main pole 15 and each of the side shields 16C and 16D.

The main pole 15 is made of a magnetic metal material. The material employed for the main pole 15 may be NiFe, CoNiFe, or CoFe. The shape of the main pole 15 will be described in detail later.

The magnetic layer 35 is disposed on the magnetic layer 34. The magnetic head further includes a nonmagnetic layer 61 made of a nonmagnetic material and disposed around the main pole 15, the side shields 16C and 16D, and the magnetic layer 35. In the present embodiment, the nonmagnetic layer 61 is made of a nonmagnetic insulating material such as alumina, in particular.

The magnetic head further includes: a nonmagnetic metal layer 58 made of a nonmagnetic metal material and disposed on part of the top surface of the main pole 15 at a position away from the medium facing surface 80; and an insulating layer 59 made of an insulating material and disposed on the top surface of the nonmagnetic metal layer 58. The nonmagnetic metal layer 58 is made of Ru, NiCr, or NiCu, for example. The insulating layer 59 is made of alumina, for example.

The first gap layer 19 is disposed to cover the main pole 15, the nonmagnetic metal layer 58 and the insulating layer 59. The first gap layer 19 is made of a nonmagnetic material. The material employed for the first gap layer 19 may be a nonmagnetic insulating material such as alumina or a nonmagnetic conductive material such as Ru, NiCu, Ta, W, NiB, or NiP.

The first shield 16A is disposed over the side shields 16C and 16D and the first gap layer 19, and is in contact with the top surfaces of the side shields 16C and 16D and the first gap layer 19. In the medium facing surface 80, part of the first end face portion 16Aa of the first shield 16A is spaced from the end face of the main pole 15 by a predetermined distance created by the thickness of the first gap layer 19. The thickness of the first gap layer 19 preferably falls within the range of 5 to 60 nm, and may be 30 to 60 nm, for example. The end face of the main pole 15 has a side that is adjacent to the first gap layer 19, and the side defines the track width.

The magnetic layer 36 is located on the magnetic layer 35. The magnetic layer 42 is located away from the medium facing surface 80 and lies on the main pole 15. The first coil 21 is contiguous with the lead layer 20. The first coil 21 is wound around the first coupling part 41 (the magnetic layer 42), and includes a portion that passes between the first coupling part 41 (the magnetic layer 42) and the second coupling part 31 (the magnetic layer 36). The third coil 22 is contiguous with the first coil 21 and wound around the second coupling part 31 (the magnetic layer 36). In FIG. 4, the boundaries between the first coil 21, the third coil 22, and the lead layer 20 are shown by dotted lines.

The magnetic head further includes an insulating film 62 and insulating layers 63 and 64 each made of an insulating material. The insulating film 62 is provided to be in contact with all surfaces of the first coil 21, the third coil 22 and the lead layer 20 except their top surfaces. The insulating layer 63 is disposed around the first coil 21, the third coil 22, the lead layer 20, the first shield 16A and the magnetic layer 36. The top surfaces of the first coil 21, the third coil 22, the lead layer 20, the first shield 16A, the magnetic layers 36 and 42, the insulating film 62, and the insulating layer 63 are even with each other. The insulating layer 64 is disposed over the top surfaces of the first coil 21, the third coil 22, the lead layer 20, and the insulating film 62. The insulating film 62 and the insulating layers 63 and 64 are made of alumina, for example.

The second yoke layer 40 is disposed over the first shield 16A, the magnetic layers 36 and 42, and the insulating layer 64. The second yoke layer 40 has an end face facing toward the medium facing surface 80. This end face is located at a distance from the medium facing surface 80. The distance from the medium facing surface 80 to an arbitrary point on the end face of the second yoke layer 40 increases with increasing distance from the arbitrary point to the top surface 1a of the substrate 1.

The magnetic head further includes an insulating layer 68 made of an insulating material and disposed around the second yoke layer 40, and a protective layer 70 made of a nonmagnetic material and disposed to cover the write head section 9. The insulating layer 68 is made of alumina, for example. The protective layer 70 is made of, for example, an inorganic insulating material such as alumina.

As has been described, the magnetic head according to the present embodiment includes the medium facing surface 80, the read head section 8, and the write head section 9. The medium facing surface 80 faces a recording medium. The read head section 8 and the write head section 9 are stacked on the substrate 1. The read head section 8 is located on the rear side in the direction T of travel of the recording medium (i.e., located on the leading side) relative to the write head section 9.

The write head section 9 includes the first coil 21, the second coil 11, the third layer 22, the lead layers 10 and 20, the main pole 15, the write shield 16, the gap part 17, the first yoke layer 30, the second yoke layer 40, the first coupling part 41, the second coupling part 31, and the magnetic layers 38 and 39. The write shield 16 includes the first shield 16A, the second shield 16B, and the two side shields 16C and 16D. The gap part 17 is composed of part of the first gap layer 19 and part of the second gap layer 18.

The first yoke layer 30 is located on the rear side in the direction T of travel of the recording medium relative to the main pole 15. The first yoke layer 30 is magnetically connected to the second shield 16B of the write shield 16 via the magnetic layers 38 and 39. The second yoke layer 40 is located on the front side in the direction T of travel of the recording medium relative to the main pole 15. The second yoke layer 40 is magnetically connected to the first shield 16A of the write shield 16.

The first coupling part 41 magnetically couples the main pole 15 and the second yoke layer 40 to each other. The second coupling part 31 magnetically couples the first yoke layer 30 and the second yoke layer 40 to each other.

The first coil 21, the second coil 11, and the third coil 22 will now be described in detail with reference to FIG. 1, FIG. 3, and FIG. 4. As shown in FIG. 1, the second coil 11 is located on the rear side in the direction T of travel of the recording medium relative to the main pole 15. As shown in FIG. 3, the second coil 11 is wound around the second coupling part 31 (the magnetic layer 32). In the example shown in FIG. 3, the second coil 11 is wound approximately three turns around the second coupling part 31 (the magnetic layer 32). The second coil 11 has a coil connection part 11S electrically connected to the third coil 22. As viewed from above, the second coil 11 is wound in a clockwise direction from the coil connection part 11S to the boundary between the second coil 11 and the lead layer 10.

As shown in FIG. 4, the first coil 21 is wound around the first coupling part 41 (the magnetic layer 42), and includes a portion passing between the first coupling part 41 (the magnetic layer 42) and the second coupling part 31 (the magnetic layer 36). In the example shown in FIG. 4, the first coil 21 is wound approximately one turn around the first coupling part 41 (the magnetic layer 42).

As shown in FIG. 1, the second coil 11 and the third coil 22 are located at positions that are different from each other in the direction T of travel of the recording medium. In the present embodiment, the third coil 22 is particularly located on the front side in the direction T of travel of the recording medium relative to the main pole 15. As previously mentioned, the third coil 22 is contiguous with the first coil 21 and wound around the second coupling part 31 (the magnetic layer 36). In the example shown in FIG. 4, the third coil 22 is wound approximately one turn around the second coupling part 31 (the magnetic layer 36).

The third coil 22 has a coil connection part 22E electrically connected to the coil connection part 11S of the second coil 11. The coil connection part 22E is electrically connected to the coil connection part 11S via a connection layer of columnar shape (not shown) that penetrates a plurality of layers interposed between the third coil 22 and the second coil 11. The connection layer is made of a conductive material such as copper.

As viewed from above, the first coil 21 is wound in a counterclockwise direction from the boundary between the first coil 21 and the lead layer 20 to the boundary between the first coil 21 and the third coil 22. As viewed from above, the third coil 22 is wound in a clockwise direction from the boundary between the first coil 21 and the third coil 22 to the coil connection part 22E.

In the example shown in FIG. 3 and FIG. 4, the first coil 21, the third coil 22, and the second coil 11 are connected in series in this order.

The shape of the main pole 15 will now be described in detail with reference to FIG. 1 to FIG. 4. As shown in FIG. 3 and FIG. 4, the main pole 15 includes a track width defining portion 15A and a wide portion 15B. The track width defining portion 15A has an end face located in the medium facing surface 80, and an end opposite to the end face. The wide portion 15B is connected to the end of the track width defining portion 15A. As shown in FIG. 1 and FIG. 2, the main pole 15 has: the top surface located at the end on the front side in the direction T of travel of the recording medium; the bottom end opposite to the top surface; the first side part; and the second side part. The width of the top surface in the track width direction TW is greater in the wide portion 15B than in the track width defining portion 15A.

In the track width defining portion 15A, the width of the top surface in the track width direction TW is generally constant regardless of the distance from the medium facing surface 80. In the wide portion 15B, the width of the top surface in the track width direction TW is, for example, equal to that in the track width defining portion 15A when seen at the boundary between the track width defining portion 15A and the wide portion 15B, and gradually increases with increasing distance from the medium facing surface 80, then becoming constant. Here, the length of the track width defining portion 15A in the direction perpendicular to the medium facing surface 80 will be referred to as the neck height. The neck height falls within the range of 0 to 0.3 µm, for example. A zero neck height means that no track width defining portion 15A exists and an end face of the wide portion 15B is thus located in the medium facing surface 80.

The top surface of the main pole 15 includes a first portion, a second portion, a third portion, and a fourth portion that are contiguously arranged in this order, the first portion being closest to the medium facing surface 80. The first portion has a first end located in the medium facing surface 80 and a second end opposite to the first end. The second portion is connected to the second end of the first portion. The third portion has a first end connected to the second portion and a second end that is located farther from the medium facing surface 80 than is the first end. The fourth portion is connected to the second end of the third portion. The first and third portions are inclined such that their respective second ends are located on the front side in the direction T of travel of the recording medium relative to their respective first ends. The second and fourth portions extend in a direction substantially perpendicular to the medium facing surface 80. The bottom surface of the first shield 16A includes a portion that is opposed to the first portion of the top surface of the main pole 15 with the first gap layer 19 constituting a portion of the gap part 17 interposed therebetween.

The bottom end of the main pole 15 includes a first portion, a second portion, a third portion, and a fourth portion that are contiguously arranged in this order, the first portion being closest to the medium facing surface 80. The first portion has a first end located in the medium facing surface 80 and a second end opposite to the first end. The second portion is connected to the second end of the first portion. The third portion has a first end connected to the second portion and a second end that is located farther from the medium facing surface 80 than is the first end. Each of the first to third portions may be an edge formed by two intersecting planes, or may be a plane connecting two planes to each other. The fourth portion is a plane connected to the second end of the third portion. The first and third portions are inclined such that their respective second ends are located on the rear side in the direction T of travel of the recording medium relative to their respective first ends. The second and fourth portions extend in a direction substantially perpendicular to the medium facing surface 80.

The end face of the main pole 15 located in the medium facing surface 80 has a first side adjacent to the first gap layer 19, a second side connected to one end of the first side, and a third side connected to the other end of the first side. The first side defines the track width. The position of an end of a record bit to be recorded on a recording medium depends on the position of the first side. The end face of the main pole 15 located in the medium facing surface 80 decreases in width in the track width direction TW with increasing distance from the first side, that is, with increasing proximity to the top surface 1a of the substrate 1. Each of the second side and the third side forms an angle of, for example, 7° to 17°, or preferably 10° to 15°, relative to the direction perpendicular to the top surface 1a of the substrate 1. The first side has a length in the range of 0.05 to 0.20 µm, for example.

The function and effects of the magnetic head according to the present embodiment will now be described. The magnetic head writes data on a recording medium by using the write head section 9 and reads data stored on the recording medium by using the read head section 8. In the write head section 9, the first coil 21, the second coil 11, and the third coil 22 produce magnetic fields corresponding to data to be written on a recording medium. A magnetic flux corresponding to the magnetic field produced by the first coil 21 passes through the first coupling part 41 and the main pole 15. Magnetic fluxes corresponding to the magnetic fields produced by the second coil 11 and the third coil 22 pass through the second coupling part 31, the second yoke layer 40, the first coupling part 41, and the main pole 15. Consequently, the main pole 15 allows the magnetic flux corresponding to the magnetic field produced by the first coil 21, the magnetic flux corresponding to the magnetic field produced by the second coil 11, and the magnetic flux corresponding to the magnetic field produced by the third coil 22 to pass therethrough.

The first coil 21, the second coil 11, and the third coil 22 may be connected in series or in parallel. In either case, the first coil 21, the second coil 11, and the third coil 22 are connected such that the magnetic flux corresponding to the magnetic field produced by the first coil 21, the magnetic flux corresponding to the magnetic field produced by the second coil 11, and the magnetic flux corresponding to the magnetic field produced by the third coil 22 flow in the same direction through the main pole 15.

The main pole 15 allows the magnetic fluxes corresponding to the magnetic fields produced by the first coil 21, the second coil 11, and the third coil 22 to pass as mentioned above, and produces a write magnetic field for writing data on a recording medium by means of the perpendicular magnetic recording system.

The write shield 16 captures a disturbance magnetic field applied to the magnetic head from the outside thereof. This makes it possible to prevent erroneous writing on a recording medium induced by the disturbance magnetic field intensively captured into the main pole 15. The write shield 16 also has the function of capturing a magnetic flux produced from the end face of the main pole 15 and spreading in directions other than the direction perpendicular to the plane of a recording medium, so as to prevent the magnetic flux from reaching the recording medium.

Furthermore, the write shield 16, the first yoke layer 30, the second yoke layer 40, the first coupling part 41, the second coupling part 31, and the magnetic layers 38 and 39 have the function of allowing a magnetic flux that has been produced from the end face of the main pole 15 and has magnetized a recording medium to flow back. More specifically, a part of the magnetic flux that has been produced from the end face of the main pole 15 and has magnetized a recording medium flows back to the main pole 15 through a first magnetic path that passes through the write shield 16, the second yoke layer 40, and the first coupling part 41 (the magnetic layer 42). Another part of the magnetic flux that has been produced from the end face of the main pole 15 and has magnetized the recording medium flows back to the main pole 15 through a second magnetic path that passes through the write shield 16, the magnetic layers 39 and 38, the first yoke layer 30, the second coupling part 31 (the magnetic layers 32 to 36), the second yoke layer 40, and the first coupling part 41. Thus, in the present embodiment, there are formed the first and second magnetic paths leading from the write shield 16 to the main pole 15. The first magnetic path is located on the front side in the direction T of travel of the recording medium relative to the main pole 15 and connects the write shield 16 and a part of the main pole 15 away from the medium facing surface 80 to each other.

The write shield 16 includes the first shield 16A, the second shield 16B, and the two side shields 16C and 16D. The present embodiment thus makes it possible that, in regions on both the front side and the rear side in the direction T of travel of a recording medium relative to the end face of the main pole 15 and regions on opposite sides of the end face of the main pole 15 in the track width direction TW, a magnetic flux that is produced from the end face of the main pole 15 and spreads in directions other than the direction perpendicular to the plane of the recording medium can be captured and thereby prevented from reaching the recording medium. Consequently, the present embodiment makes it possible to prevent adjacent track erasure induced by a skew. The first and second shields 16A and 16B contribute not only to the prevention of adjacent track erasure induced by a skew but also to an increase in the gradient of the write magnetic field. The side shields 16C and 16D greatly contribute to the prevention of adjacent track erasure, in particular. According to the present embodiment, such functions of the write shield 16 serve to increase the recording density.

Furthermore, as shown in FIG. 2, the present embodiment is configured so that in the medium facing surface 80, the distance between the first and second side parts of the main pole 15 in the track width direction TW, i.e., the width of the end face of the main pole 15, decreases with increasing proximity to the top surface 1a of the substrate 1. According to the present embodiment, this feature also serves to prevent adjacent track erasure induced by a skew.

The present embodiment is also configured so that in the medium facing surface 80, the distance between the first and second sidewalls of the side shields 16C and 16D in the track width direction TW decreases with increasing proximity to the top surface 1a of the substrate 1, as does the distance between the first and second side parts of the main pole 15. The present embodiment thus allows both the distance between the first side part and the first sidewall and the distance between the second side part and the second sidewall to be small and constant in the medium facing surface 80. This configuration allows the side shields 16C and 16D to efficiently capture the magnetic flux that is produced from the end face of the main pole 15 and spreads out to opposite areas in the track width direction TW. Consequently, according to the present embodiment, it is possible to enhance the function of the side shields 16C and 16D in particular, and to thereby enable more effective prevention of adjacent track erasure induced by a skew.

For effective functioning of the write shield 16, it is important for the write shield 16 to be able to capture much magnetic flux. The provision of the magnetic head with the first and second magnetic paths leading from the write shield 16 to the main pole 15 as in the present embodiment is thus effective.

In the present embodiment, the top surface of the main pole 15 includes the first and third portions that are inclined such that their respective second ends are located on the front side in the direction T of travel of the recording medium relative to their respective first ends, while the bottom end of the main pole 15 includes the first and third portions that are inclined such that their respective second ends are located on the rear side in the direction T of travel of the recording medium relative to their respective first ends. This allows the main pole 15 to have a small thickness in the medium facing surface 80, thereby allowing the prevention of adjacent track erasure induced by a skew. On the other hand, since a portion of the main pole 15 away from the medium facing surface 80 can have a large thickness, it is possible for the main pole 15 to direct much magnetic flux to the medium facing surface 80, and this allows the improvement of write characteristics such as the overwrite property.

Additionally, as the frequency of a recording signal is increased in order to increase the recording density, the magnetic head is required to be improved in the rate of change in the direction of the magnetic flux produced from the end face of the main pole 15. The position of an end of a record bit depends on the position of an end of the end face of the main pole 15 located in the medium facing surface 80, the end being located on the front side in the direction T of travel of the recording medium. To increase the recording density, it is therefore required to improve the rate of change in the direction of the magnetic flux passing through the first shield 16A as well as to improve the rate of change in the direction of the magnetic flux produced from the end face of the main pole 15. To meet these requirements, it is effective to reduce the length of a magnetic path that passes through the first shield 16A and the main pole 15. In the present embodiment, there is provided the first magnetic path for connecting the main pole 15 and the first shield 16A to each other. This allows the length of the aforementioned magnetic path to be shorter than in the case where the first magnetic path is not provided.

In the present embodiment, the main pole 15, the gap part 17 (part of the gap layer 19), the write shield 16, and the first magnetic path (the second yoke layer 40 and the first coupling part 41) form a space enclosed by these components. The number of turns of the first coil 21 passing through the space is approximately one. The present embodiment makes it possible to reduce the length of the first magnetic path by configuring the first coil 21 to have a small number of turns. Consequently, it is possible to improve both the rate of change in the direction of the magnetic flux produced from the end face of the main pole 15 and the rate of change in the direction of the magnetic flux passing through the first shield 16A, thereby allowing the enhancement of the recording density.

However, merely configuring the first coil 21 to have a small number of turns will result in a reduction in the magnetomotive force provided by the first coil 21, so that the main pole 15 will become unable to produce a write magnetic field of sufficient magnitude. To address this problem, the present embodiment is provided with the second magnetic path, the second coil 11, and the third coil 22 in addition to the first magnetic path and the first coil 21. Consequently, even if the number of turns of the first coil 21 is reduced to reduce the length of the first magnetic path, the magnetomotive forces of the first coil 21, the second coil 11, and the third coil 22 allow the main pole 15 to produce a write magnetic field of sufficient magnitude.

In the present embodiment, in particular, the number of turns of the second coil 11 is approximately three, the number of turns of the third coil 22 is approximately one, and the number of turns of the first coil 21 is approximately one. Now, a magnetic head of a comparative example will be contemplated. In the magnetic head of the comparative example, the second coil 11 and the third coil 22 are not provided and the number of turns of the first coil 21 is five. The remainder of configuration of the magnetic head of the comparative example is the same as that of the magnetic head according to the present embodiment. The total magnetomotive force produced by the first coil 21, the second coil 11, and the third coil 22 in the present embodiment is almost equal to the magnetomotive force produced by the first coil 21 in the magnetic head of the comparative example. On the other hand, the present embodiment allows the first magnetic path to be smaller in length because the number of turns of the first coil 21 is smaller than that in the magnetic head of the comparative example. Thus, when compared with the magnetic head of the comparative example, the present embodiment allows a reduction in length of the first magnetic path while allowing the magnitude of the write magnetic field produced by the main pole 15 to be equivalent to that in the magnetic head of the comparative example.

Furthermore, in the present embodiment, the number of turns of each of the second coil 11 and the third coil 22 can be increased without being restricted by the number of turns of the first coil 21. The number of turns of the second coil 11 and the number of turns of the third coil 22 may be no smaller than that of the first coil 21. Alternatively, the number of turns of the second coil 11 may be greater than that of the first coil 21 while the number of turns of the third coil 22 may be no smaller than that of the first coil 21. By increasing the number of turns of the second coil 11 and that of the third coil 22 in this manner, the second coil 11 and the third coil 22 can provide increased magnetomotive forces.

In the present embodiment, in particular, the second coupling part 31 is located farther from the medium facing surface 80 than is the first coupling part 41. This makes it possible to easily increase the number of turns of each of the second and third coils 11 and 22 wound around the second coupling part 31.

Furthermore, in the present embodiment, the second coil 11 is located on the rear side in the direction T of travel of the recording medium relative to the main pole 15. This makes it possible to place the second coil 11 without restriction by the location of the first coil 21. Consequently, it is possible to easily increase the number of turns of the second coil 11.

Furthermore, in the present embodiment, the second and third coils 11 and 22 are located at positions that are different from each other in the direction T of travel of the recording medium. This makes it possible to increase the number of turns of each of the second and third coils 11 and 22.

As can be seen from the foregoing, the present embodiment allows the main pole 15 to produce a write magnetic field of sufficient magnitude while allowing a reduction in length of the first magnetic path which is located on the front side in the direction T of travel of a recording medium relative to the main pole 15.

Second Embodiment

Figure 5:
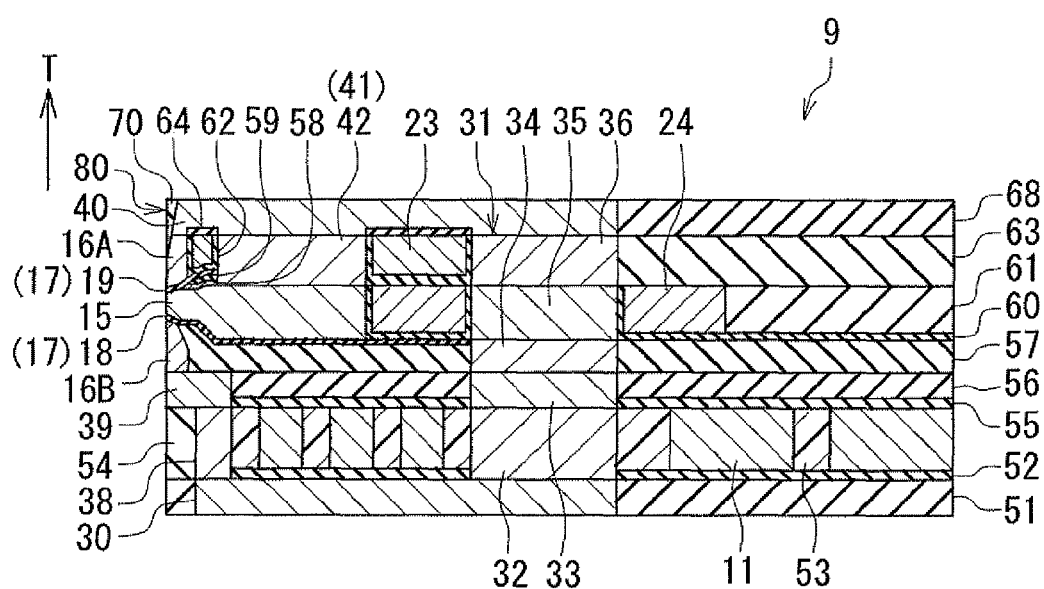
FIG. 5 is a cross-sectional view of a magnetic head according to a second embodiment of the invention.
Figure 6:
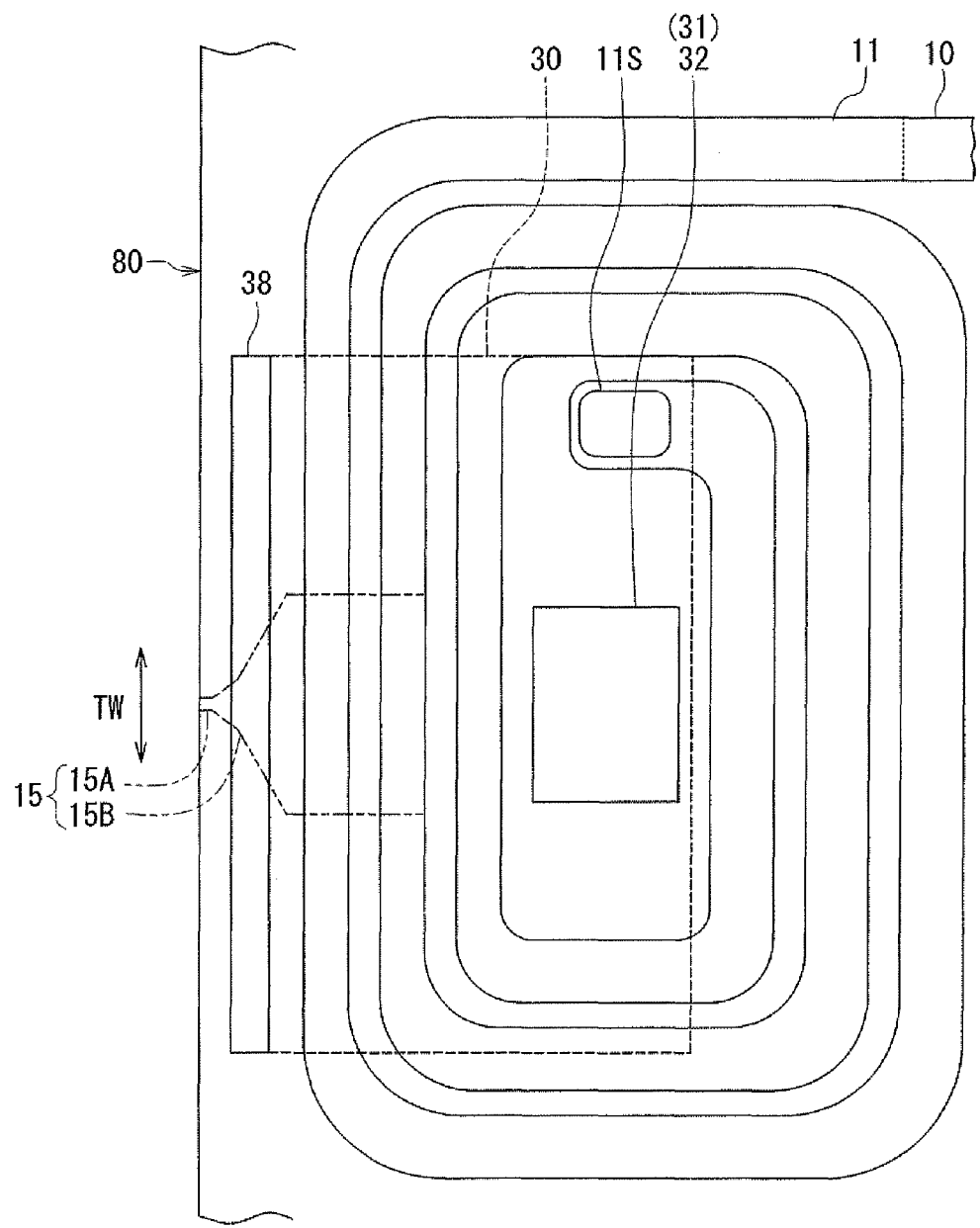
FIG. 6 is a plan view showing a second coil of the magnetic head according to the second embodiment of the invention.
Figure 7:
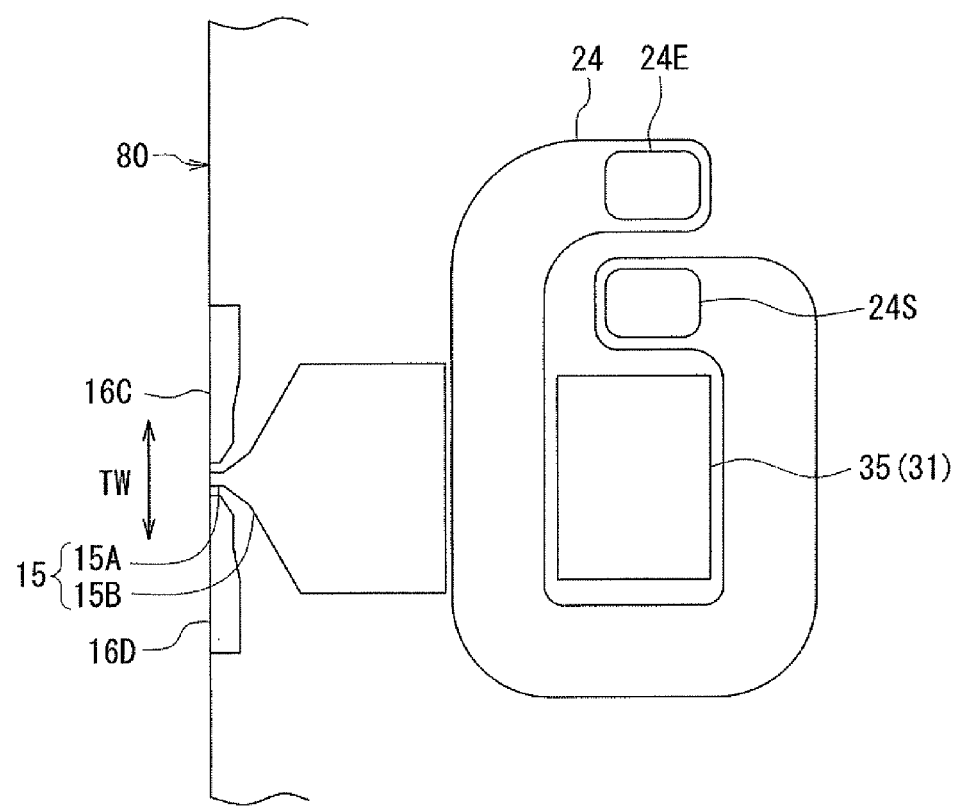
FIG. 7 is a plan view showing a third coil of the magnetic head according to the second embodiment of the invention.
Figure 8:
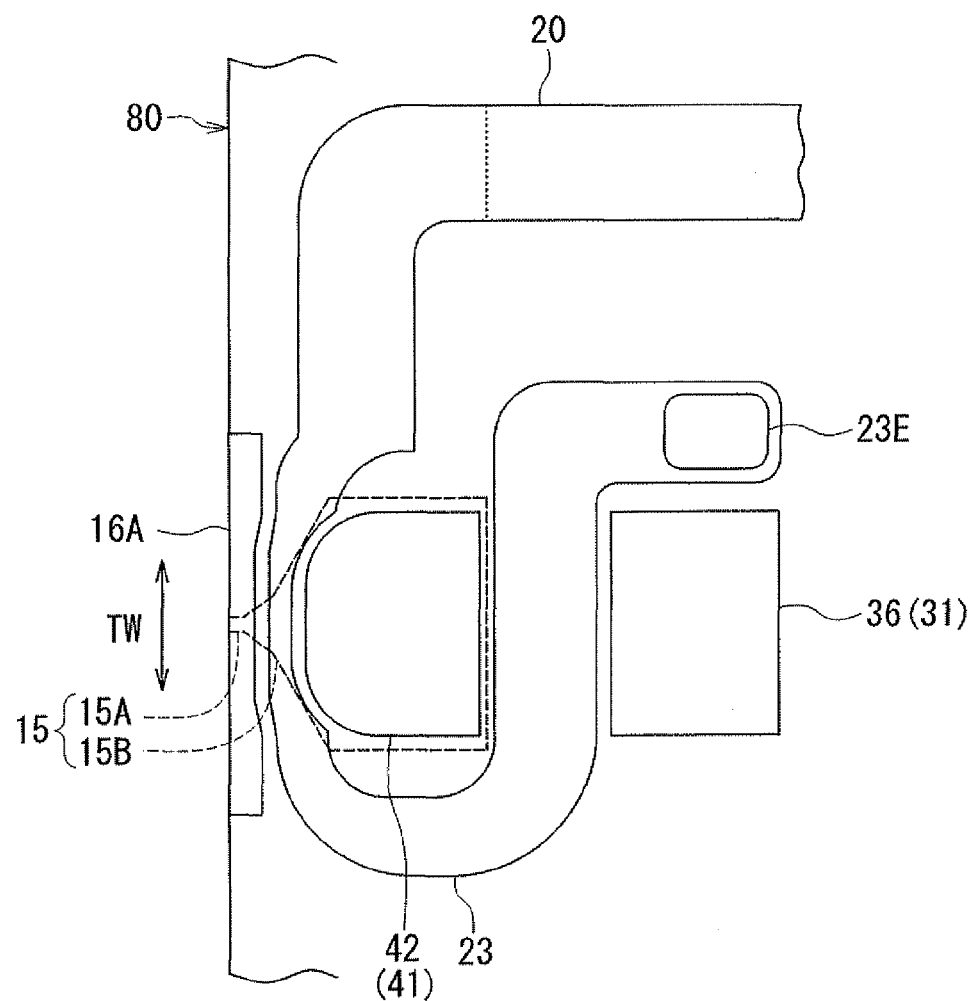
FIG. 8 is a plan view showing a first coil of the magnetic head according to the second embodiment of the invention.

A magnetic head according to a second embodiment of the invention will now be described with reference to FIG. 5 to FIG. 8. FIG. 5 is a cross-sectional view of the magnetic head according to the present embodiment. Note that FIG. 5 shows the main cross section. FIG. 6 is a plan view showing a second coil of the magnetic head according to the present embodiment. FIG. 7 is a plan view showing a third coil of the magnetic head according to the present embodiment. FIG. 8 is a plan view showing a first coil of the magnetic head according to the present embodiment.

The magnetic head according to the present embodiment is different from the magnetic head according to the first embodiment in the following respects. In the present embodiment, the write head section 9 has a first coil 23 and a third coil 24 in place of the first coil 21 and the third coil 22 of the first embodiment. Here, assume a virtual plane that intersects the end face of the main pole 15 located in the medium facing surface 80 and is perpendicular to the direction T of travel of the recording medium. The third coil 24 is located at a position intersecting the virtual plane. The first and third coils 23 and 24 are each made of a conductive material such as copper.

As shown in FIG. 7, the third coil 24 is wound around the second coupling part 31 (the magnetic layer 35). In the example shown in FIG. 7, the third coil 24 is wound approximately one turn around the second coupling part 31 (the magnetic layer 35).

The third coil 24 has a coil connection part 24S electrically connected to the first coil 23, and a coil connection part 24E electrically connected to the coil connection part 11S of the second coil 11. As viewed from above, the third coil 24 is wound in a clockwise direction from the coil connection part 24S to the coil connection part 24E. The coil connection part 24E is electrically connected to the coil connection part 11S of the second coil 11 via the connection layer mentioned in the description of the first embodiment. In the present embodiment, as shown in FIG. 6, the coil connection part 11S is located at a position different from that shown in FIG. 3 of the first embodiment.

The nonmagnetic layer 61 is disposed around the third coil 24. The magnetic head according to the present embodiment further includes an insulating film 60 made of an insulating material and interposed between the third coil 24 and each of the main pole 15, the second gap layer 18, the magnetic layer 35 and the nonmagnetic layer 57. The insulating film 60 is made of alumina, for example.

The positional relationship of the first coil 23 with the lead layer 20, the first coupling part 41 (the magnetic layer 42) and the second coupling part 31 (the magnetic layer 36) is the same as that of the first coil 21 of the first embodiment. More specifically, the first coil 23 is contiguous with the lead layer 20. In FIG. 8, the boundary between the first coil 23 and the lead layer 20 is shown by a dotted line. The first coil 23 is wound around the first coupling part 41 (the magnetic layer 42), and includes a portion passing between the first coupling part 41 (the magnetic layer 42) and the second coupling part 31 (the magnetic layer 36). In the example shown in FIG. 8, the first coil 23 is wound approximately one turn around the first coupling part 41 (the magnetic layer 42). The first coil 23 has a coil connection part 23E electrically connected to the coil connection part 24S of the third coil 24. As viewed from above, the first coil 23 is wound in a counterclockwise direction from the boundary between the first coil 23 and the lead layer 20 to the coil connection part 23E.

The insulating film 62 is interposed between the first coil 23 and the third coil 24. An opening for exposing the coil connection part 24S of the third coil 24 is formed in the insulating film 62. The coil connection part 23E of the first coil 23 is electrically connected to the coil connection part 24S through the opening formed in the insulating film 62.

In the present embodiment, a magnetic flux corresponding to a magnetic field produced by the first coil 23 passes through the first coupling part 41 and the main pole 15. A magnetic flux corresponding to a magnetic field produced by the third coil 24 passes through the second coupling part 31, the second yoke layer 40, the first coupling part 41, and the main pole 15. The remainder of configuration, function and effects of the present embodiment are similar to those of the first embodiment.

Third Embodiment

Figure 9:
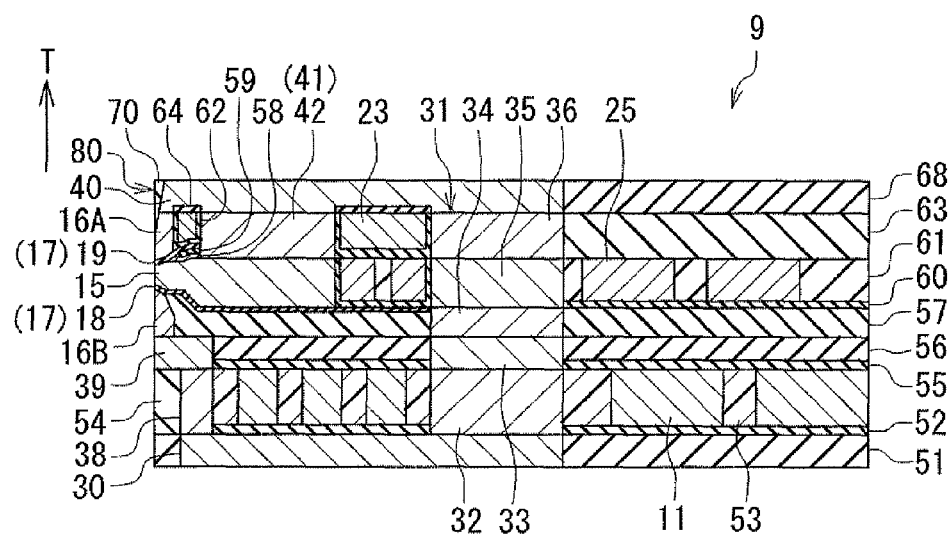
FIG. 9 is a cross-sectional view of a magnetic head according to a third embodiment of the invention.
Figure 10:
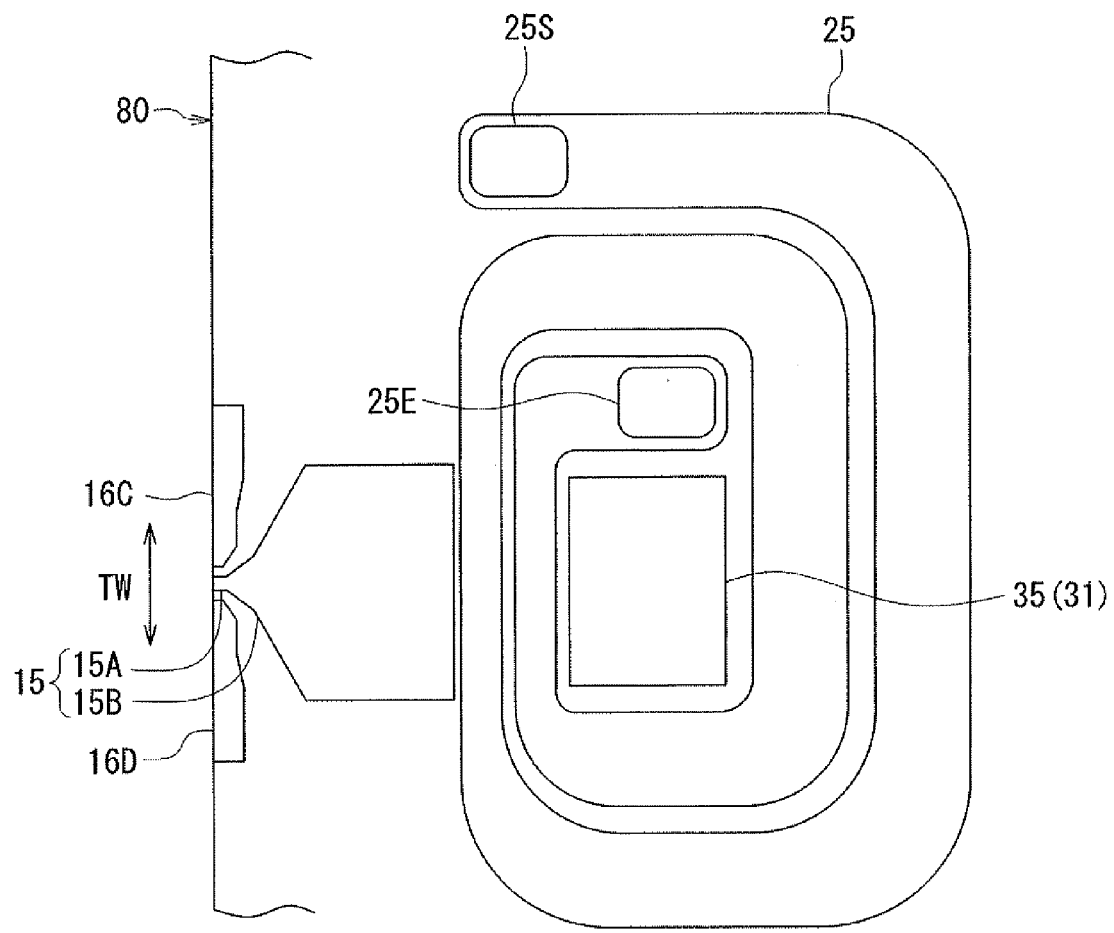
FIG. 10 is a plan view showing a third coil of the magnetic head according to the third embodiment of the invention.
Figure 11:
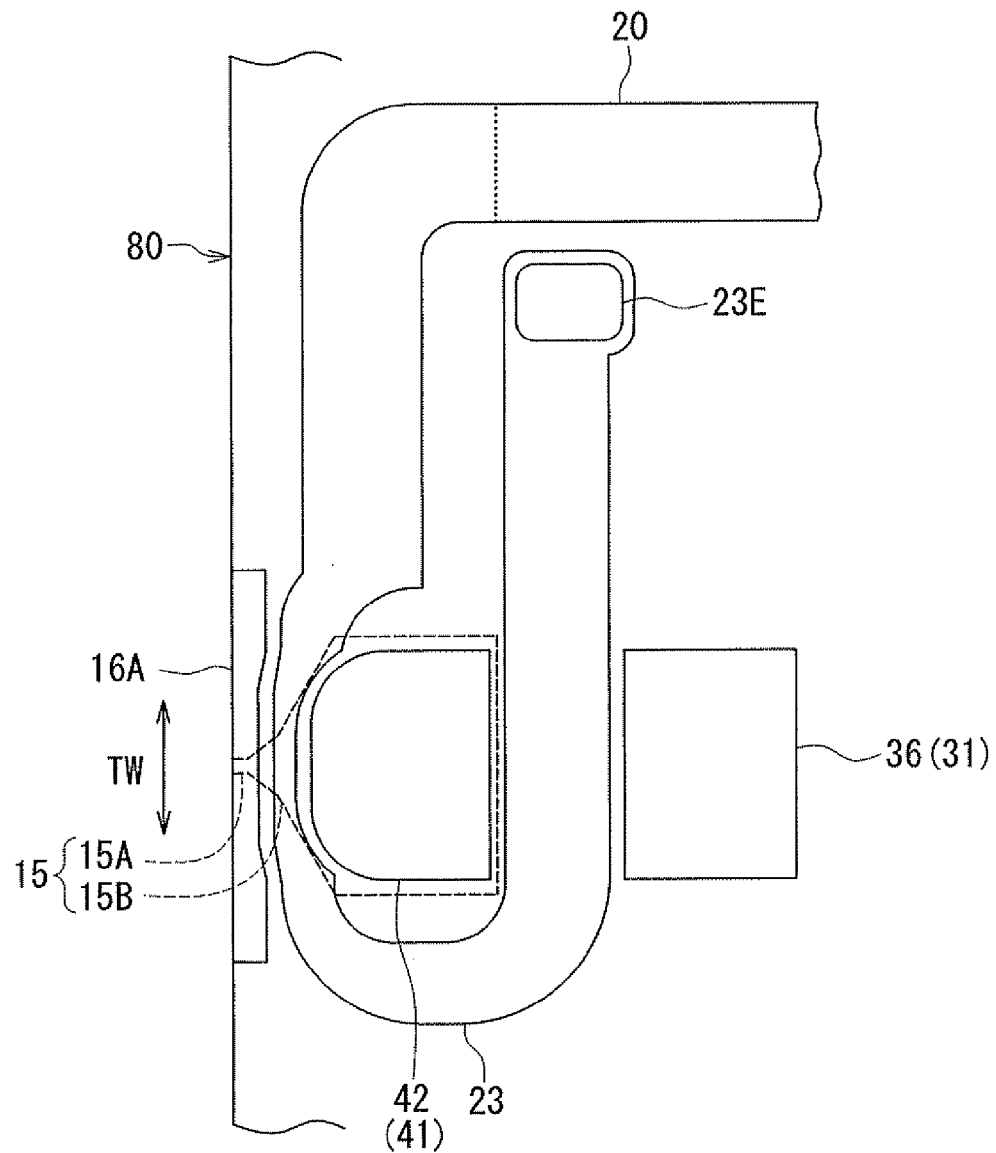
FIG. 11 is a plan view showing a first coil of the magnetic head according to the third embodiment of the invention.

A magnetic head according to a third embodiment of the invention will now be described with reference to FIG. 9 to FIG. 11. FIG. 9 is a cross-sectional view of the magnetic head according to the present embodiment. Note that FIG. 9 shows the main cross section. FIG. 10 is a plan view showing a third coil of the magnetic head according to the present embodiment. FIG. 11 is a plan view showing a first coil of the magnetic head according to the present embodiment.

The magnetic head according to the present embodiment is different from the magnetic head according to the second embodiment in the following respects. In the present embodiment, the write head section 9 has a third coil 25 in place of the third coil 24 of the second embodiment. The third coil 25 is made of a conductive material such as copper.

The positional relationship of the third coil 25 with the main pole 15 and the second coupling part 31 (the magnetic layer 35) is the same as that of the third coil 24 of the second embodiment. More specifically, the third coil 25 is located at the position intersecting the virtual plane mentioned in the description of the second embodiment. The third coil 25 is wound around the second coupling part 31 (the magnetic layer 35). In the example shown in FIG. 10, the third coil 25 is wound approximately two turns around the second coupling part 31 (the magnetic layer 35). The nonmagnetic layer 61 is disposed around the third coil 25 and in the space between adjacent turns of the third coil 25.

The third coil 25 has a coil connection part 25S electrically connected to the coil connection part 23E of the first coil 23, and a coil connection part 25E electrically connected to the coil connection part 11S of the second coil 11. As viewed from above, the third coil 25 is wound in a clockwise direction from the coil connection part 25S to the coil connection part 25E.

The insulating film 62 is interposed between the first coil 23 and the third coil 25. An opening for exposing the coil connection part 25S of the third coil 25 is formed in the insulating film 62. The coil connection part 23E is electrically connected to the coil connection part 25S through the opening formed in the insulating film 62. In the present embodiment, as shown in FIG. 11, the coil connection part 23E is located at a position different from that shown in FIG. 8 of the second embodiment.

The coil connection part 25E is electrically connected to the coil connection part 11S via the connection layer mentioned in the description of the first embodiment. In the present embodiment, the coil connection part 11S is located at the position shown in FIG. 3 of the first embodiment.

In the present embodiment, a magnetic flux corresponding to a magnetic field produced by the third coil 25 passes through the second coupling part 31, the second yoke layer 40, the first coupling part 41, and the main pole 15. The remainder of configuration, function and effects of the present embodiment are similar to those of the second embodiment.

Fourth Embodiment

Figure 12:
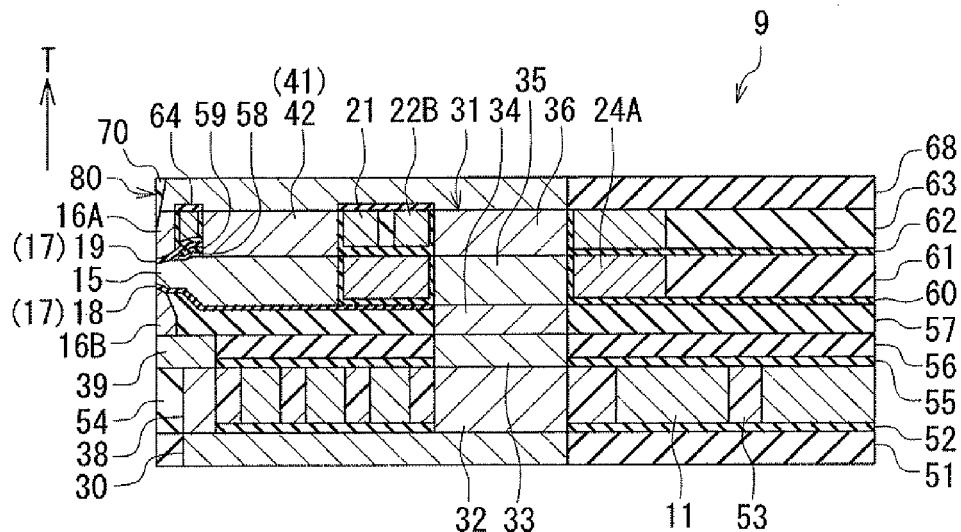
FIG. 12 is a cross-sectional view of a magnetic head according to a fourth embodiment of the invention.

A magnetic head according to a fourth embodiment of the invention will now be described with reference to FIG. 12. FIG. 12 is a cross-sectional view of the magnetic head according to the present embodiment. Note that FIG. 12 shows the main cross section.

The magnetic head according to the present embodiment is different from the magnetic head according to the second embodiment in the following respects. In the present embodiment, the write head section 9 has the first coil 21 of the first embodiment in place of the first coil 23 of the second embodiment. The write head section 9 further has a third coil having a first layer 24A and a second layer 22B in place of the third coil 24 of the second embodiment. The shape and location of the first layer 24A are the same as those of the third coil 24 of the second embodiment. The shape and location of the second layer 22B are the same as those of the third coil 22 of the first embodiment. In the present embodiment, the first layer 24A, a part of the third coil, is located at the position intersecting the virtual plane mentioned in the description of the second embodiment.

The third coil has coil connection parts 24S and 24E (see FIG. 7) provided in the first layer 24A and a coil connection part 22E (see FIG. 4) provided in the second layer 22B. The coil connection part 22E is electrically connected to the coil connection part 24S through the opening formed in the insulating film 62. The coil connection part 24E is electrically connected to the coil connection part 11S (see FIG. 6) of the second coil 11 via the connection layer mentioned in the description of the second embodiment (the first embodiment).

In the present embodiment, magnetic fluxes corresponding to magnetic fields produced by the first layer 24A and the second layer 22B of the third coil pass through the second coupling part 31, the second yoke layer 40, the first coupling part 41, and the main pole 15. The remainder of configuration, function and effects of the present embodiment are similar to those of the first or second embodiment.

Fifth Embodiment

Figure 13:
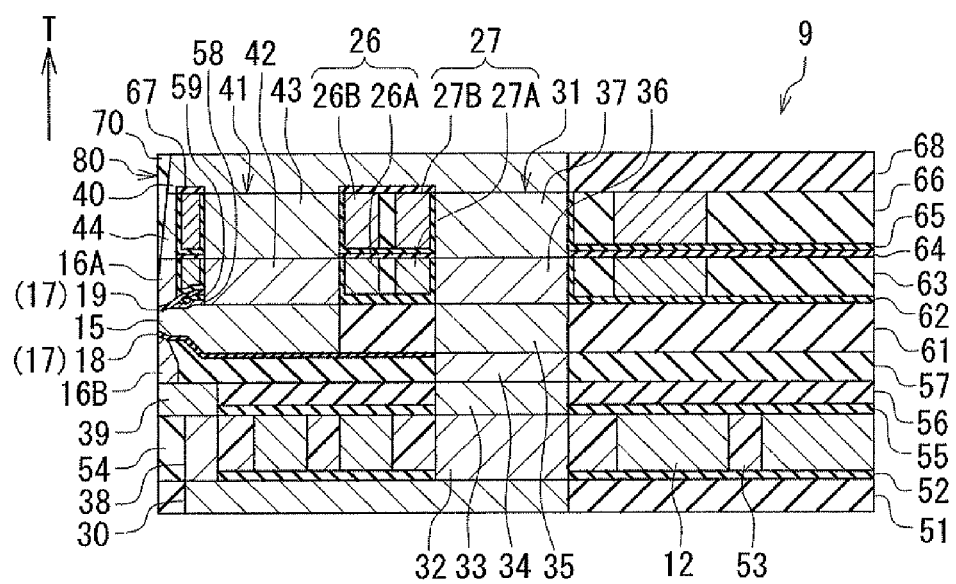
FIG. 13 is a cross-sectional view of a magnetic head according to a fifth embodiment of the invention.
Figure 14:
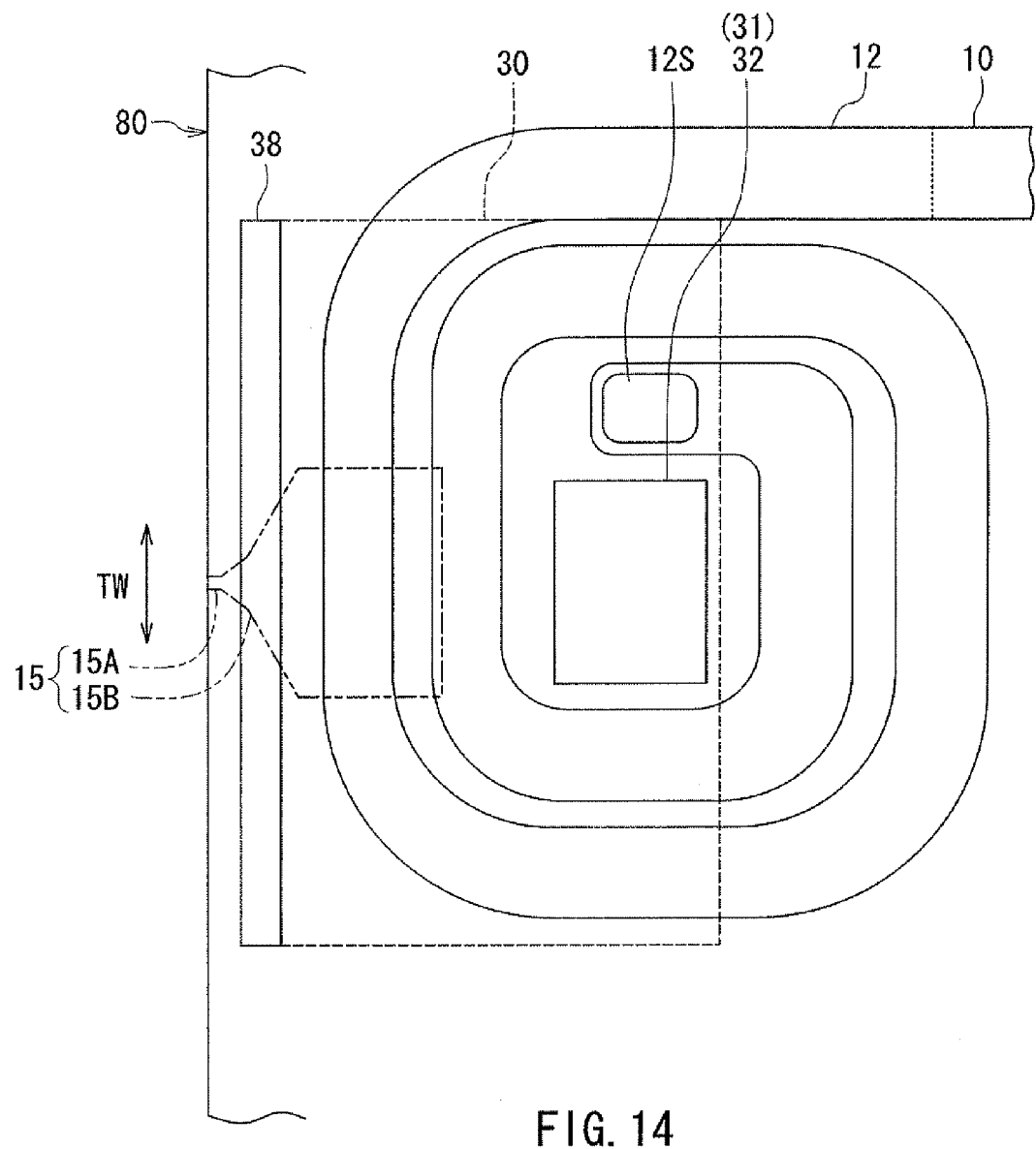
FIG. 14 is a plan view showing a second coil of the magnetic head according to the fifth embodiment of the invention.
Figure 15:
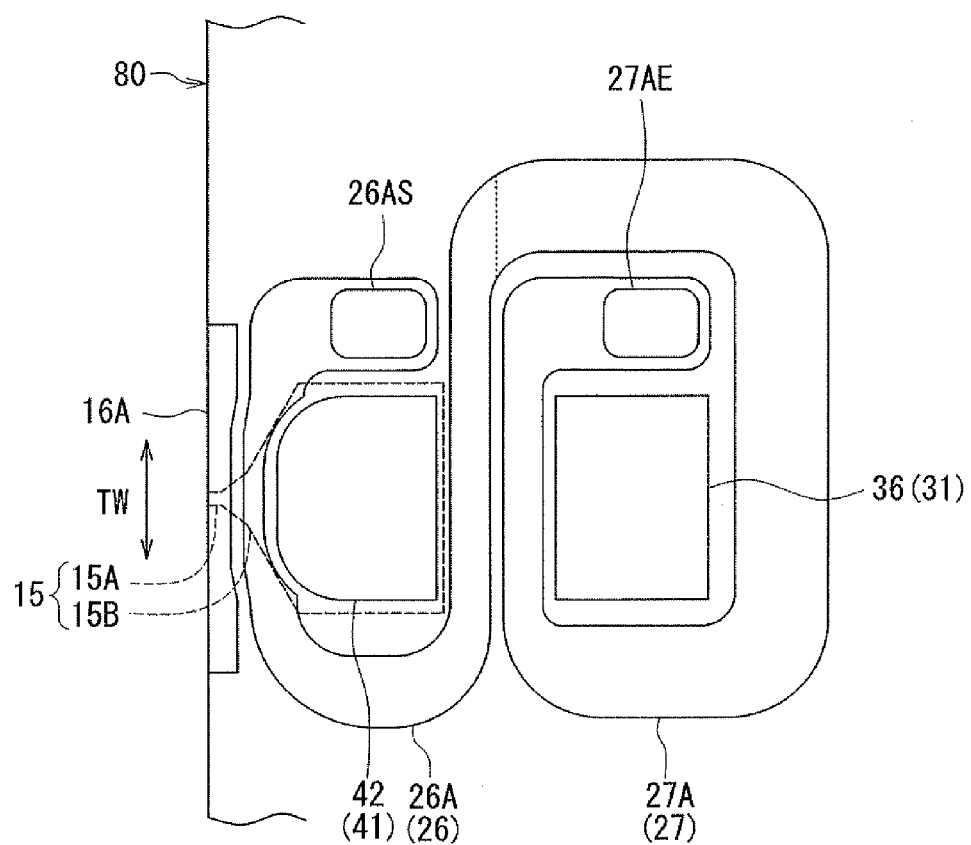
FIG. 15 is a plan view showing a first layer of a first coil and a first layer of a third coil of the magnetic head according to the fifth embodiment of the invention.
Figure 16:
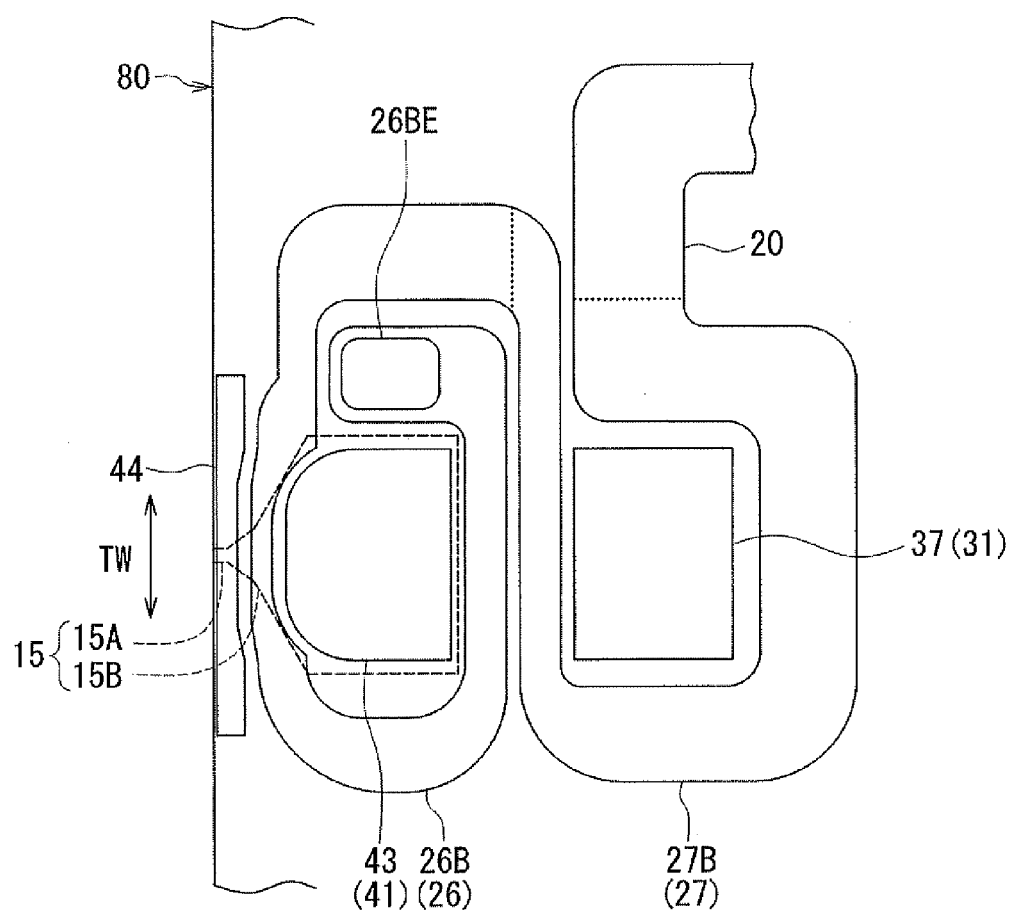
FIG. 16 is a plan view showing a second layer of the first coil and a second layer of the third coil of the magnetic head according to the fifth embodiment of the invention.

A magnetic head according to a fifth embodiment of the invention will now be described with reference to FIG. 13 to FIG. 16. FIG. 13 is a cross-sectional view of the magnetic head according to the present embodiment. Note that FIG. 13 shows the main cross section. FIG. 14 is a plan view showing a second coil of the magnetic head according to the present embodiment. FIG. 15 is a plan view showing a first layer of a first coil and a first layer of a third coil of the magnetic head according to the present embodiment. FIG. 16 is a plan view showing a second layer of the first coil and a second layer of the third coil of the magnetic head according to the present embodiment.

The magnetic head according to the present embodiment is different from the magnetic head according to the first embodiment in the following respects. In the present embodiment, the write head section 9 has a second coil 12 in place of the second coil 11 of the first embodiment. The second coil 12 is made of a conductive material such as copper.

The positional relationship of the second coil 12 with the main pole 15, the second coupling part 31 (the magnetic layer 32) and the lead layer 10 is the same as that of the second coil 11 of the first embodiment. More specifically, the second coil 12 is located on the rear side in the direction T of travel of the recording medium relative to the main pole 15, and is wound around the second coupling part 31 (the magnetic layer 32). In the example shown in FIG. 14, the second coil 12 is wound approximately two turns around the second coupling part 31 (the magnetic layer 32). The lead layer 10 is contiguous with the second coil 12. In FIG. 14, the boundary between the second coil 12 and the lead layer 10 is shown by a dotted line. The second coil 12 has a coil connection part 12S electrically connected to a first layer of a third coil which will be described later. As viewed from above, the second coil 12 is wound in a clockwise direction from the coil connection part 12S to the boundary between the second coil 12 and the lead layer 10.

Furthermore, in the present embodiment, the first coupling part 41 includes not only the magnetic layer 42 but also a magnetic layer 43 located on the magnetic layer 42. The second coupling part 31 includes not only the magnetic layers 32 to 36 but also a magnetic layer 37 located on the magnetic layer 36. Further, the write head section 9 has a magnetic layer 44 made of a magnetic material and stacked on the first shield 16A. The magnetic layer 44 has an end face facing toward the medium facing surface 80. This end face is located at a distance from the medium facing surface 80. The distance from the medium facing surface 80 to an arbitrary point on the end face of the magnetic layer 44 increases with increasing distance from the arbitrary point to the top surface 1a of the substrate 1. The material employed for the magnetic layer 44 may be CoFeN, CoNiFe, NiFe, or CoFe, for example.

Furthermore, in the present embodiment, the write head section 9 has a first coil 26 and a third coil 27 in place of the first coil 21 and the third coil 22 of the first embodiment. The first coil 26 has a first layer 26A and a second layer 26B. The third coil 27 has a first layer 27A and a second layer 27B. The first and third coils 26 and 27 are each made of a conductive material such as copper.

FIG. 15 is a plan view showing the first layer 26A of the first coil 26 and the first layer 27A of the third coil 27. The first layers 26A and 27A are coplanar and contiguous with each other. In FIG. 15, the boundary between the first layers 26A and 27A is shown by a dotted line.

The positional relationship of the first layer 26A with the first coupling part 41 (the magnetic layer 42) and the second coupling part 31 (the magnetic layer 36) is the same as that of the first coil 21 of the first embodiment. More specifically, the first layer 26A is wound around the first coupling part 41 (the magnetic layer 42), and includes a portion passing between the first coupling part 41 (the magnetic layer 42) and the second coupling part 31 (the magnetic layer 36). In the example shown in FIG. 15, the first layer 26A is wound approximately one turn around the first coupling part 41 (the magnetic layer 42). The first coil 26 has a coil connection part 26AS provided in the first layer 26A.

The positional relationship of the first layer 27A with the second coupling part 31 (the magnetic layer 36) is the same as that of the third coil 22 of the first embodiment. More specifically, the first layer 27A is wound around the second coupling part 31 (the magnetic layer 36). In the example shown in FIG. 15, the first layer 27A is wound approximately one turn around the second coupling part 31 (the magnetic layer 36). The third coil 27 has a coil connection part 27AE provided in the first layer 27A. The coil connection part 27AE is electrically connected to the coil connection part 12S of the second coil 12 via the connection layer mentioned in the description of the first embodiment.

As viewed from above, the first layer 26A is wound in a counterclockwise direction from the coil connection part 26AS to the boundary between the first layers 26A and 27A. As viewed from above, the first layer 27A is wound in a clockwise direction from the boundary between the first layers 26A and 27A to the coil connection part 27AE. The insulating layer 63 is disposed around the first layers 26A and 27A and in the space between adjacent turns of each of the first layers 26A and 27A.

FIG. 16 is a plan view showing the second layer 26B of the first coil 26 and the second layer 27B of the third coil 27. The second layers 26B and 27B and the lead layer 20 are coplanar and contiguous with each other. In FIG. 16, the boundaries between the second layers 26B and 27B and the lead layer 20 are shown by dotted lines.

The second layer 27B is wound around the second coupling part 31 (the magnetic layer 37). In the example shown in FIG. 16, the second layer 27B is wound approximately one turn around the second coupling part 31 (the magnetic layer 37).

The second layer 26B is wound around the first coupling part 41 (the magnetic layer 43), and includes a portion passing between the first coupling part 41 (the magnetic layer 43) and the second coupling part 31 (the magnetic layer 37). In the example shown in FIG. 16, the second layer 26B is wound approximately one turn around the first coupling part 41 (the magnetic layer 43). The first coil 26 has a coil connection part 26BE provided in the second layer 26B.

As viewed from above, the second layer 27B is wound in a clockwise direction from the boundary between the second layer 27B and the lead layer 20 to the boundary between the second layers 26B and 27B. As viewed from above, the second layer 26B is wound in a counterclockwise direction from the boundary between the second layers 26B and 27B to the coil connection part 26BE.

The magnetic head according to the present embodiment further includes an insulating film 65 and insulating layers 66 and 67 each made of an insulating material. The insulating film 65 separates the second layers 26B and 27B and the lead layer 20 from the magnetic layers 37, 43, and 44 and the insulating layer 64. The insulating layer 66 is disposed around the second layers 26B and 27B, the lead layer 20, and the magnetic layers 37 and 44. The top surfaces of the second layers 26B and 27B, the lead layer 20, the magnetic layers 37, 43 and 44, the insulating film 65, and the insulating layer 66 are even with each other. The insulating layer 67 is disposed over the top surfaces of the second layers 26B and 27B, the lead layer 20, and the insulating film 65. The insulating film 65 and the insulating layers 66 and 67 are made of alumina, for example.

The insulating layer 64 and the insulating film 65 are interposed between the first layer 26A and the second layer 26B. Openings are formed in the insulating layer 64 and the insulating film 65 for exposing the coil connection part 26AS provided in the first layer 26A. The coil connection part 26BE provided in the second layer 26B is electrically connected to the coil connection part 26AS through the openings formed in the insulating layer 64 and the insulating film 65.

In the present embodiment, the second yoke layer 40 is disposed over the magnetic layers 37, 43 and 44 and the insulating layer 67. The first coupling part 41 (the magnetic layers 42 and 43) magnetically couples the main pole 15 and the second yoke layer 40 to each other. The second coupling part 31 (the magnetic layers 32 to 37) magnetically couples the first yoke layer 30 and the second yoke layer 40 to each other. The magnetic layer 44 magnetically couples the first shield 16A of the write shield 16 and the second yoke layer 40 to each other.

In the present embodiment, the third coil 27 is located on the front side in the direction T of travel of the recording medium relative to the main pole 15. Magnetic fluxes corresponding to magnetic fields produced by the first layer 26A and the second layer 26B of the first coil 26 pass through the first coupling part 41 and the main pole 15. Magnetic fluxes corresponding to magnetic fields produced by the first layer 27A and the second layer 27B of the third coil 27 pass through the second coupling part 31, the second yoke layer 40, the first coupling part 41, and the main pole 15. The remainder of configuration, function and effects of the present embodiment are similar to those of the first embodiment.

Sixth Embodiment

Figure 17:
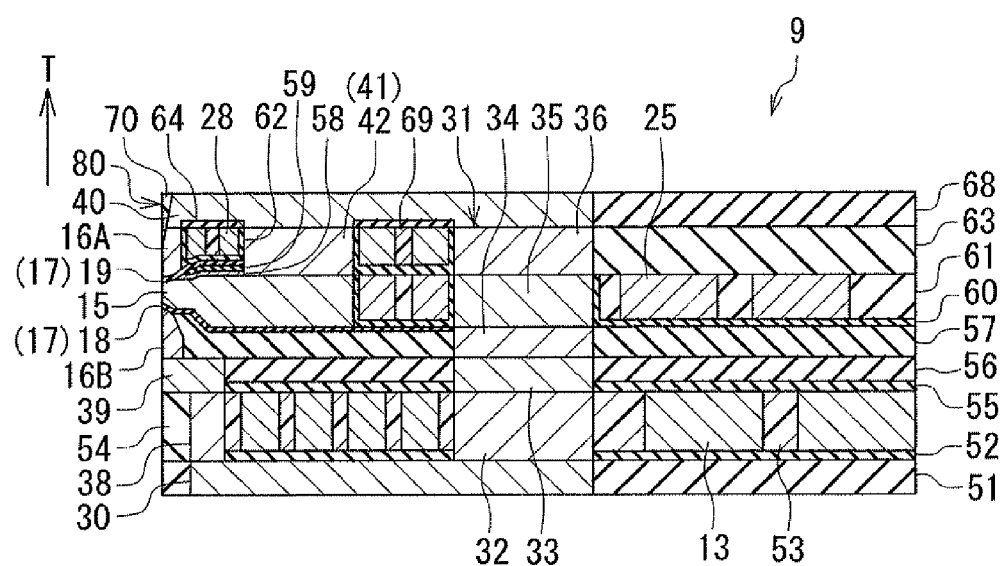
FIG. 17 is a cross-sectional view of a magnetic head according to a sixth embodiment of the invention.
Figure 18:
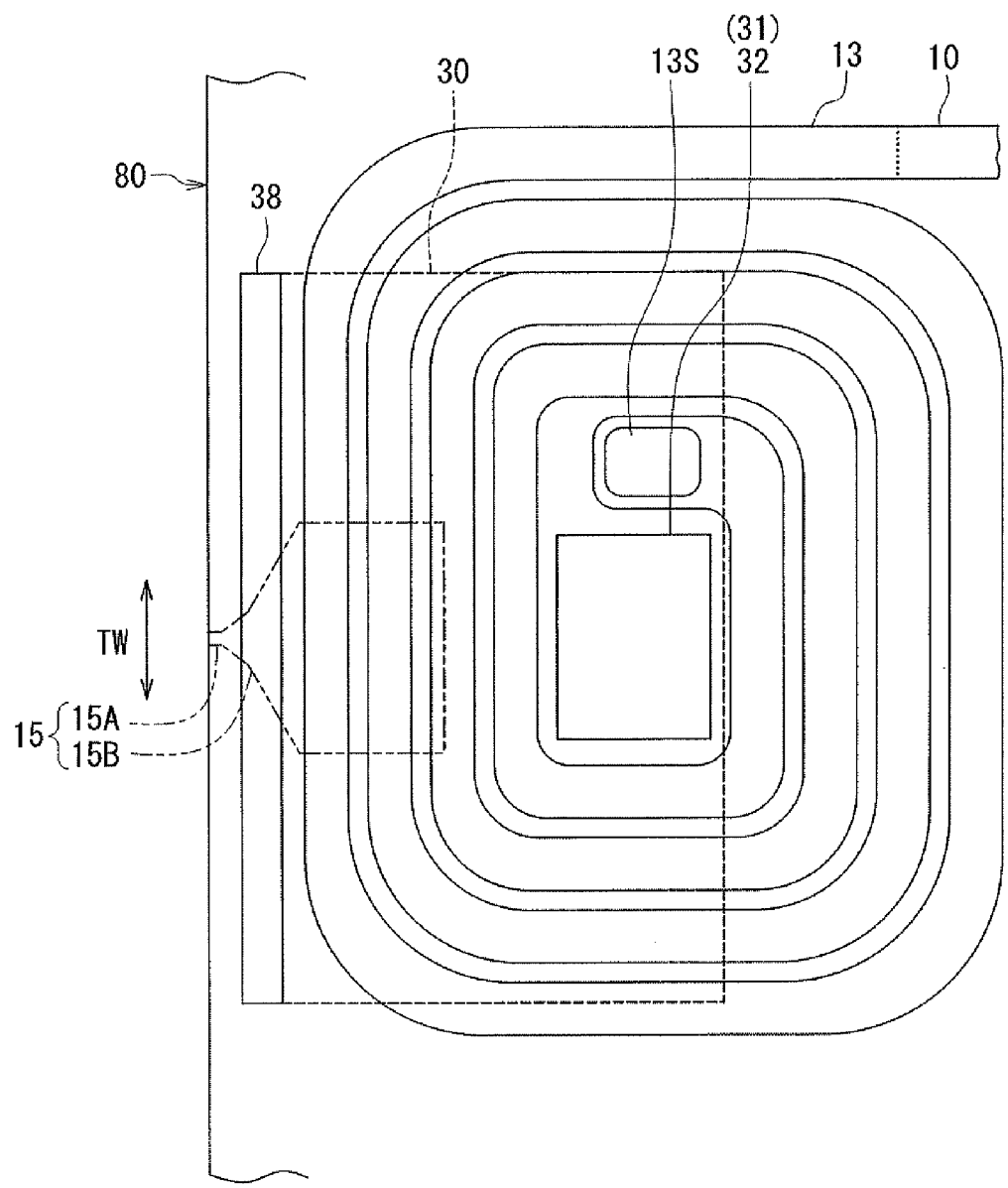
FIG. 18 is a plan view showing a second coil of the magnetic head according to the sixth embodiment of the invention.
Figure 19:
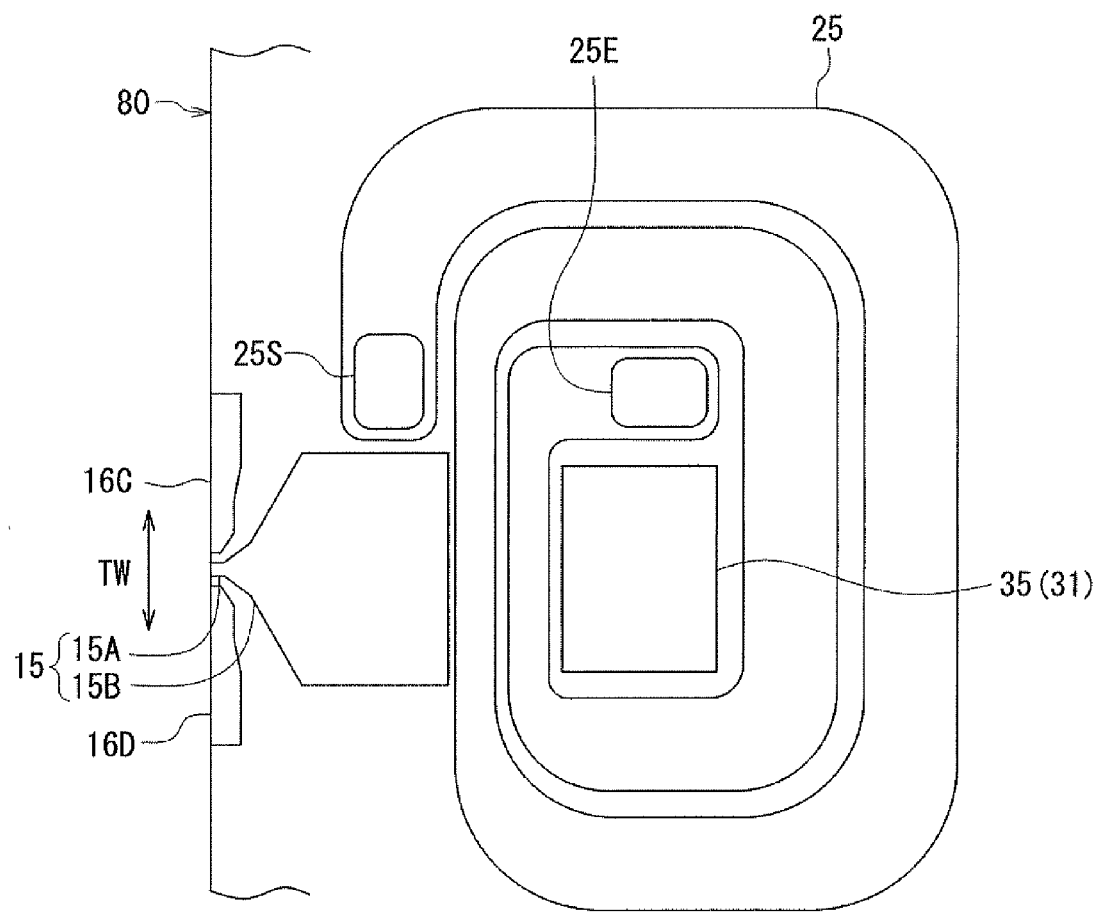
FIG. 19 is a plan view showing a third coil of the magnetic head according to the sixth embodiment of the invention.
Figure 20:
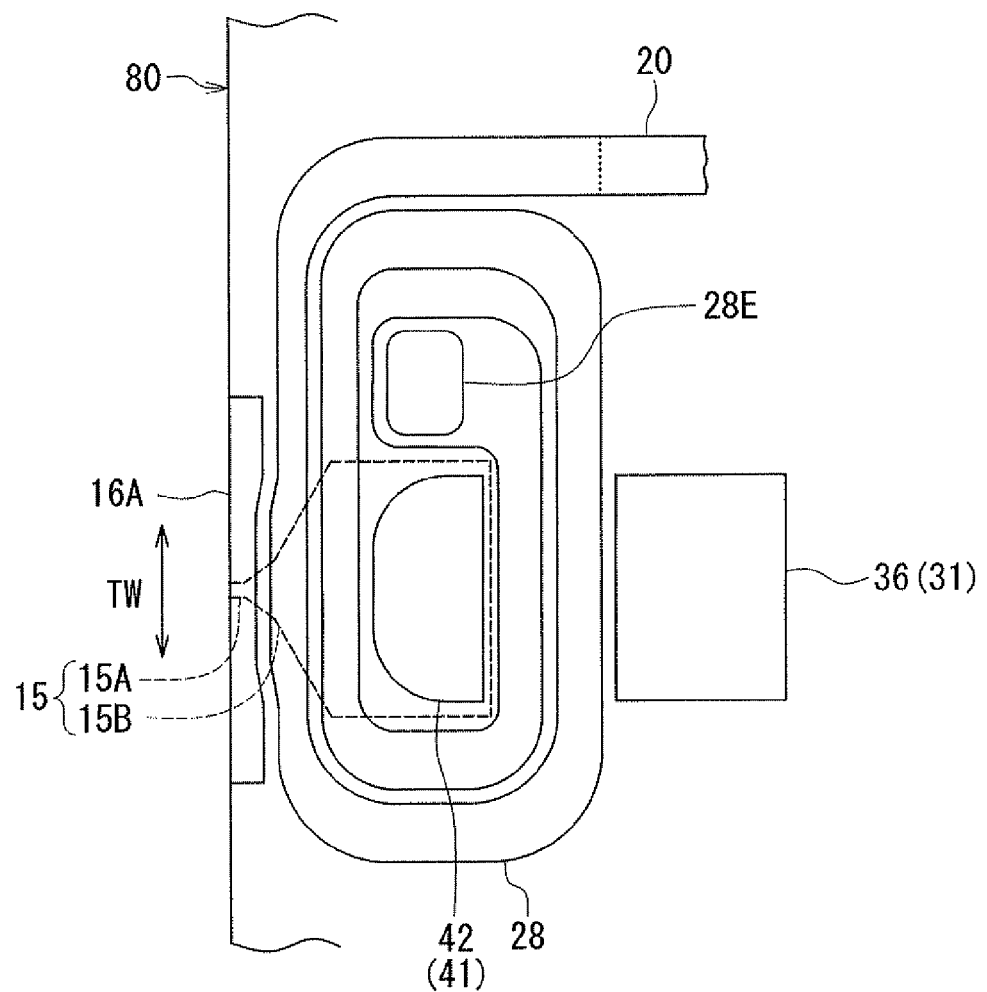
FIG. 20 is a plan view showing a first coil of the magnetic head according to the sixth embodiment of the invention.

A magnetic head according to a sixth embodiment of the invention will now be described with reference to FIG. 17 and FIG. 20. FIG. 17 is a cross-sectional view of the magnetic head according to the present embodiment. Note that FIG. 17 shows the main cross section. FIG. 18 is a plan view showing a second coil of the magnetic head according to the present embodiment. FIG. 19 is a plan view showing a third coil of the magnetic head according to the present embodiment. FIG. 20 is a plan view showing a first coil of the magnetic head according to the present embodiment.

The magnetic head according to the present embodiment is different from the magnetic head according to the third embodiment in the following respects. In the present embodiment, the write head section 9 has a first coil 28 and a second coil 13 in place of the first coil 23 and the second coil 11 of the third embodiment. The first coil 28 and the second coil 13 are each made of a conductive material such as copper.

The positional relationship of the second coil 13 with the main pole 15, the second coupling part 31 (the magnetic layer 32) and the lead layer 10 is the same as that of the second coil 11 of the third embodiment. More specifically, the second coil 13 is located on the rear side in the direction T of travel of the recording medium relative to the main pole 15, and is wound around the second coupling part 31 (the magnetic layer 32). In the example shown in FIG. 18, the second coil 13 is wound approximately four turns around the second coupling part 31 (the magnetic layer 32). The lead layer 10 is contiguous with the second coil 13. In FIG. 18, the boundary between the second coil 13 and the lead layer 10 is shown by a dotted line.

The second coil 13 has a coil connection part 13S electrically connected to the coil connection part 25E of the third coil 25. As viewed from above, the second coil 13 is wound in a clockwise direction from the coil connection part 13S to the boundary between the second coil 13 and the lead layer 10. The coil connection part 25E is electrically connected to the coil connection part 13S via the connection layer mentioned in the description of the third embodiment (the first embodiment).

The positional relationship of the first coil 28 with the lead layer 20, the first coupling part 41 (the magnetic layer 42) and the second coupling part 31 (the magnetic layer 36) is the same as that of the first coil 23 of the third embodiment. More specifically, the first coil 28 is wound around the first coupling part 41 (the magnetic layer 42), and includes a portion passing between the first coupling part 41 (the magnetic layer 42) and the second coupling part 31 (the magnetic layer 36). The lead layer 20 is contiguous with the first coil 28. In FIG. 20, the boundary between the first coil 28 and the lead layer 20 is shown by a dotted line. In the example shown in FIG. 20, the first coil 28 is wound approximately two turns around the first coupling part 41 (the magnetic layer 42).

The first coil 28 has a coil connection part 28E electrically connected to the coil connection part 25S of the third coil 25. As viewed from above, the first coil 28 is wound in a counterclockwise direction from the boundary between the first coil 28 and the lead layer 20 to the coil connection part 28E. The magnetic head according to the present embodiment further includes an insulating layer 69 made of an insulating material and disposed in the space between adjacent turns of the first coil 28. The insulating layer 69 is made of photoresist, for example.

The insulating film 62 is interposed between the first coil 28 and the third coil 25. An opening for exposing the coil connection part 25S of the third coil 25 is formed in the insulating film 62. The coil connection part 28E of the first coil 28 is electrically connected to the coil connection part 25S through the opening formed in the insulating film 62. In the present embodiment, as shown in FIG. 19, the coil connection part 25S is located at a position different from that shown in FIG. 10 of the third embodiment.

The remainder of configuration, function and effects of the present embodiment are similar to those of the first embodiment.

The present invention is not limited to the foregoing embodiments, and various modifications may be made thereto. For example, the second coupling part 31 may be located on at least either one of two opposite sides of the first coupling part 41 in the track width direction.

The first coil may be formed of a stack of three or more layers each of which is wound around the first coupling part and includes a portion passing between the first coupling part and the second coupling part.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A magnetic head for perpendicular magnetic recording, comprising:
   a medium facing surface that faces a recording medium;
   first, second, and third coils that produce magnetic fields corresponding to data to be written on the recording medium;
   a main pole having an end face located in the medium facing surface, the main pole allowing magnetic fluxes that correspond to the magnetic fields produced by the first, second, and third coils to pass, and producing a write magnetic field for writing the data on the recording medium by means of a perpendicular magnetic recording system;
   a write shield made of a magnetic material and having an end face located in the medium facing surface;
   a gap part made of a nonmagnetic material and interposed between the main pole and the write shield;
   a first yoke layer made of a magnetic material, magnetically connected to the write shield and located on a rear side in a direction of travel of the recording medium relative to the main pole;
   a second yoke layer made of a magnetic material, magnetically connected to the write shield and located on a front side in the direction of travel of the recording medium relative to the main pole;
   a first coupling part located away from the medium facing surface and magnetically coupling the main pole and the second yoke layer to each other; and
   a second coupling part located away from the medium facing surface and magnetically coupling the first yoke layer and the second yoke layer to each other without touching the main pole, wherein:
   the end face of the write shield includes a first end face portion located on the front side in the direction of travel of the recording medium relative to the end face of the main pole;
   the first coil is wound around the first coupling part, and includes a portion that passes between the first coupling part and the second coupling part; and
   the second and third coils are located at positions that are different from each other in the direction of travel of the recording medium, and are wound around the second coupling part.

2. The magnetic head for perpendicular magnetic recording according to claim 1, wherein the second coupling part is located farther from the medium facing surface than is the first coupling part.

3. The magnetic head for perpendicular magnetic recording according to claim 1, wherein the second coil is located on the rear side in the direction of travel of the recording medium relative to the main pole.

4. The magnetic head for perpendicular magnetic recording according to claim 3, wherein the third coil is located on the front side in the direction of travel of the recording medium relative to the main pole.

5. The magnetic head for perpendicular magnetic recording according to claim 3, wherein, assuming a virtual plane that intersects the end face of the main pole located in the medium facing surface and is perpendicular to the direction of travel of the recording medium, at least part of the third coil is located at a position intersecting the virtual plane.

6. The magnetic head for perpendicular magnetic recording according to claim 1, wherein each of the second coil and the third coil has a number of turns no smaller than that of the first coil.

7. The magnetic head for perpendicular magnetic recording according to claim 1, wherein the second coil has a number of turns greater than that of the first coil, while the third coil has a number of turns no smaller than that of the first coil.

8. The magnetic head for perpendicular magnetic recording according to claim 1, wherein the end face of the write shield further includes a second, a third, and a fourth end face portion, the second end face portion being located on the rear side in the direction of travel of the recording medium relative to the end face of the main pole, the third and fourth end face portions being located on opposite sides of the end face of the main pole in a track width direction.

* * * * *